(12) United States Patent
Chinthapally et al.

(10) Patent No.: US 12,116,936 B2
(45) Date of Patent: Oct. 15, 2024

(54) MOUNTING SYSTEM FOR GEARBOX INCLUDING CORRUGATED BUSHING

(71) Applicant: HONEYWELL INTERNATIONAL INC., Charlotte, NC (US)

(72) Inventors: Srinivas Chinthapally, Hyderabad (IN); Somayaji Chittavajhula, Hyderabad (IN); Arnab Das, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/188,108

(22) Filed: Mar. 22, 2023

(65) Prior Publication Data

US 2024/0247615 A1 Jul. 25, 2024

(30) Foreign Application Priority Data

Jan. 20, 2023 (IN) .............................. 202311004091

(51) Int. Cl.
*F02C 7/32* (2006.01)
*F02C 7/06* (2006.01)

(52) U.S. Cl.
CPC .................. *F02C 7/32* (2013.01); *F02C 7/06* (2013.01); *F05D 2240/50* (2013.01); *F05D 2260/30* (2013.01); *F05D 2260/4031* (2013.01)

(58) Field of Classification Search
CPC .......... F02C 7/06; F02C 7/32; F05D 2240/50; F05D 2260/30; F05D 2260/4031; F16C 27/02; F16C 27/06; F16C 27/063; F16C 29/002; F16F 1/3732; F16F 1/3735; F16F 1/3835; F16F 1/376
See application file for complete search history.

(56) References Cited

U.S. PATENT DOCUMENTS

| | | | |
|---|---|---|---|
| 2,819,105 A | 1/1958 | Behnke et al. | |
| 3,271,188 A | 9/1966 | Albert et al. | |
| 8,613,555 B2 | 12/2013 | Benco et al. | |
| 8,905,083 B2 | 12/2014 | Strunk | |
| 10,883,635 B2 | 1/2021 | Strunk | |
| 2005/0121219 A1 | 6/2005 | Pohl | |
| 2012/0304811 A1* | 12/2012 | Niggemeier | F02C 7/32 74/606 R |
| 2012/0326369 A1* | 12/2012 | Kawachi | B60K 15/067 267/141.4 |
| 2013/0045040 A1 | 2/2013 | Ginn et al. | |
| 2014/0018177 A1 | 1/2014 | Drechsle et al. | |

(Continued)

FOREIGN PATENT DOCUMENTS

| | | |
|---|---|---|
| DE | 19733478 A1 | 2/1999 |
| EP | 3296215 A1 | 3/2018 |
| EP | 3477151 A1 | 5/2019 |

*Primary Examiner* — Loren C Edwards
(74) *Attorney, Agent, or Firm* — Lorenz & Kopf LLP

(57) ABSTRACT

A mounting system for coupling a gearbox to an engine includes a sleeve having a first sleeve end opposite a second sleeve end, an outer perimeter and a sleeve bore defined through the sleeve from the first sleeve end to the second sleeve end. The mounting system includes a damping member coupled about the outer perimeter of the sleeve at the first sleeve end. The mounting system includes a corrugated bushing coupled about the outer perimeter of the sleeve between the damping member and the second sleeve end.

20 Claims, 12 Drawing Sheets

(56) References Cited

U.S. PATENT DOCUMENTS

| | | |
|---|---|---|
| 2016/0245710 A1 | 8/2016 | Twelves, Jr et al. |
| 2017/0260909 A1 | 9/2017 | Jiang et al. |
| 2020/0124084 A1 | 4/2020 | Mabire |
| 2021/0148407 A1 | 5/2021 | Werner et al. |
| 2021/0254659 A1 | 8/2021 | Brillon et al. |

* cited by examiner

MOUNTING SYSTEM FOR GEARBOX INCLUDING CORRUGATED BUSHING

CROSS REFERENCE TO RELATED APPLICATION

This application claims priority to India Provisional Patent Application No. 202311004091, filed Jan. 20, 2023, the entire content of which is incorporated by reference herein.

TECHNICAL FIELD

The present disclosure generally relates to mounting systems for gearboxes, such as gearboxes associated with engines, and more particularly relates to a mounting system for a gearbox associated with an engine of a vehicle that includes a corrugated bushing.

BACKGROUND

Gas turbine engines may be employed to power various devices. For example, a gas turbine engine may be employed to power a vehicle, such as an aircraft. Typically, gas turbine engines include accessories that assist in engine operation and in the operation of the vehicle. These accessories are driven by a gearbox, which is driven by the gas turbine engine. Generally, the gearbox is mounted to the gas turbine engine. In certain instances, the gas turbine engine may experience vibrations during operation. As the gearbox is coupled to the gas turbine engine, the vibration of the gas turbine engine may impart loads to the gearbox, which is undesirable.

Accordingly, it is desirable to provide a mounting system for a gearbox, which includes a corrugated bushing to assist in reducing loads transferred to the gearbox from the engine. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a mounting system for coupling a gearbox to an engine. The mounting system includes a sleeve having a first sleeve end opposite a second sleeve end, an outer perimeter and a sleeve bore defined through the sleeve from the first sleeve end to the second sleeve end. The mounting system includes a damping member coupled about the outer perimeter of the sleeve at the first sleeve end. The mounting system includes a corrugated bushing coupled about the outer perimeter of the sleeve between the damping member and the second sleeve end.

The corrugated bushing has a bushing outer perimeter and a bushing inner perimeter, and at least one chamber is defined between the bushing outer perimeter and the bushing inner perimeter. The at least one chamber comprises a plurality of hollow chambers that are spaced apart about the bushing outer perimeter. The at least one chamber comprises a plurality of hollow chambers that are spaced apart axially from a first bushing end to a second bushing end of the corrugated bushing. The corrugated bushing defines a plurality of undulations that extend tangentially about a bushing outer perimeter of the corrugated bushing. The corrugated bushing defines a plurality of undulations that extend axially along a bushing outer perimeter of the corrugated bushing from a first bushing end to a second bushing end. The corrugated bushing includes a plurality of corrugations, each of the plurality of corrugations includes a sidewall, a first ramp surface coupled to the sidewall and a second ramp surface coupled to the first ramp surface, and the second ramp surface is coupled to the sidewall of an adjacent one of the plurality of corrugations. The sidewall includes a plurality of undulations. The corrugated bushing includes a plurality of corrugations defined on a sheet that defines a bushing outer perimeter of the corrugated bushing, each of the plurality of corrugations includes a first ramp surface and a second ramp surface coupled to the first ramp surface, and the sheet is coupled to a bushing sleeve that defines a bushing inner perimeter of the corrugated bushing by a plurality of sidewalls. Each of the plurality of sidewalls includes a plurality of undulations. The mounting system includes a mounting housing that defines a coupling bore and a second coupling bore. The sleeve, the damping member and the corrugated bushing are each configured to be received within the coupling bore such that the outer perimeter of the sleeve faces an inner diameter of the coupling bore and a bushing outer perimeter of the corrugated bushing is spaced apart from the inner diameter of the coupling bore. The coupling bore is configured to couple the mounting system to the engine and the second coupling bore is configured to couple the mounting system to the gearbox.

Also provided is a mounting system for coupling a gearbox to an engine. The mounting system includes a sleeve having a first sleeve end opposite a second sleeve end, and a sleeve bore defined through the sleeve from the first sleeve end to the second sleeve end. The mounting system includes a damping member coupled about the sleeve at the first sleeve end, and a corrugated bushing coupled about the sleeve between the damping member and the second sleeve end. The corrugated bushing includes a bushing sleeve that defines a bushing inner perimeter of the corrugated bushing and a plurality of corrugations that define a bushing outer perimeter of the corrugated bushing. The bushing sleeve is coupled about the sleeve and the bushing sleeve is coupled to the plurality of corrugations by a plurality of sidewalls.

The plurality of corrugations are defined tangentially about the bushing outer perimeter of the corrugated bushing. The plurality of corrugations are defined axially from a first bushing end to a second bushing end. Each of the plurality of sidewalls is planar. Each of the plurality of sidewalls includes a plurality of undulations. Each of the plurality of undulations includes at least a first sidewall peak, a second sidewall peak and a trough defined between the first sidewall peak and the second sidewall peak in a clockwise direction. The plurality of corrugations, the plurality of sidewalls and the bushing sleeve cooperate to define a plurality of chambers. The mounting system includes the gearbox and the gearbox defines a gearbox coupling bore configured to receive the mounting system such that a bushing outer perimeter of the corrugated bushing is spaced apart from an inner diameter of the gearbox coupling bore. The mounting system includes a mounting housing that defines a coupling bore and a second coupling bore offset from the coupling bore. The sleeve, the damping member and the corrugated bushing are each configured to be received within the coupling bore such that an outer perimeter of the sleeve faces an inner diameter of the coupling bore and the bushing outer perimeter of the corrugated bushing is spaced apart from the inner diameter of the coupling bore. The coupling bore is configured to couple the mounting system to the engine and the second coupling bore is configured to couple the mounting system to the gearbox.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
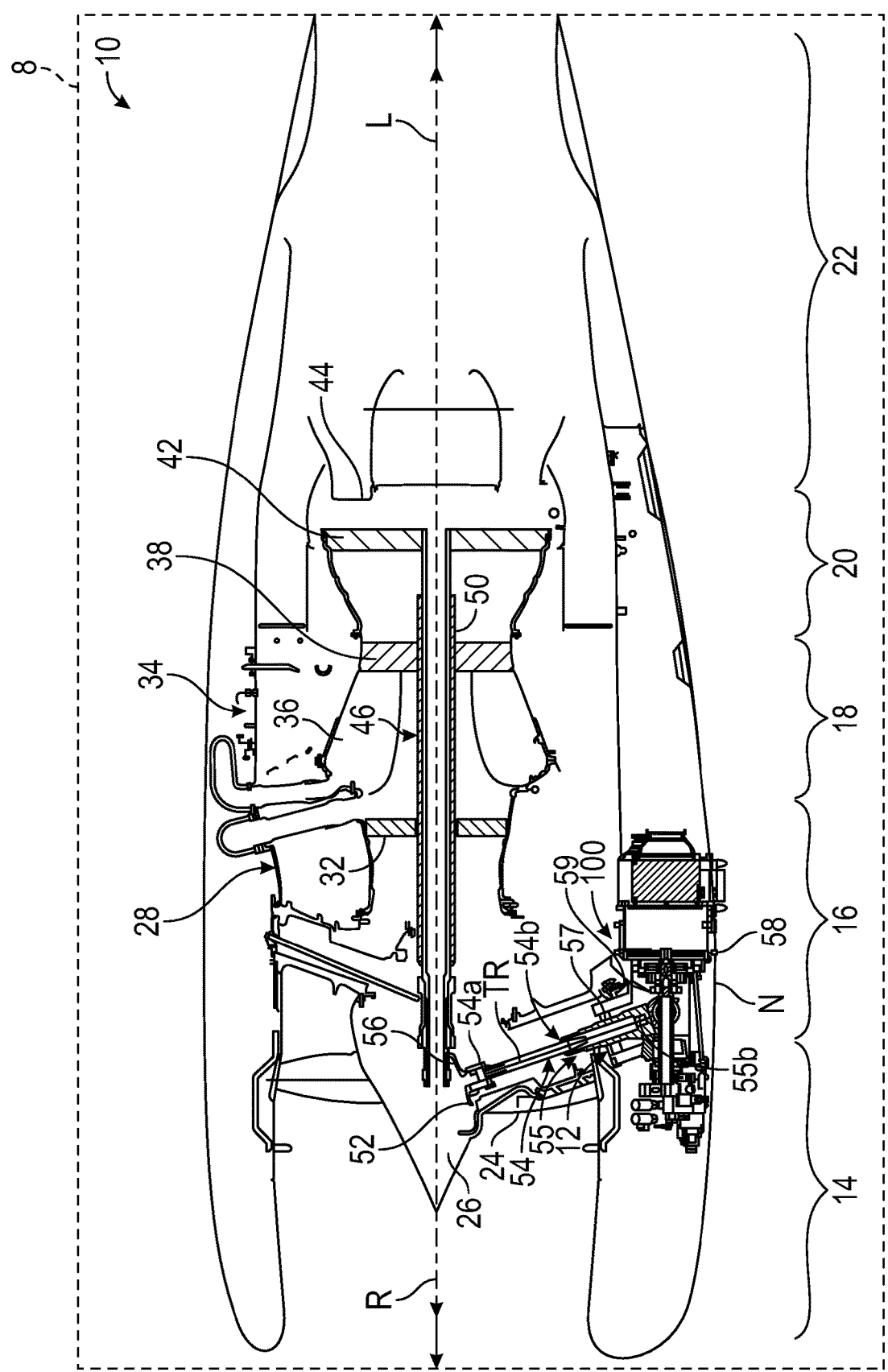
FIG. 1 is a schematic illustration of an engine, such as a gas turbine engine, that includes a gearbox coupled to the gas turbine engine with a mounting system including at least one corrugated bushing in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of system that would benefit from reduced load transfer through a mounting system, and the use of the mounting system for a gearbox of a gas turbine engine associated with a vehicle described herein is merely one exemplary embodiment according to the present disclosure. In addition, while the mounting system is described herein as being used with a gas turbine engine onboard a vehicle, such as a bus, motorcycle, train, automobile, marine vessel, aircraft, rotorcraft and the like, the various teachings of the present disclosure can be used with a gas turbine engine in other applications. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. Furthermore, the term "tangential" as used herein may refer to a direction or a relationship of a component that is perpendicular or normal to the axial and radial directions in a gas turbine engine in a cylindrical coordinate system. As used herein, the term "about" denotes within 5% to account for manufacturing tolerances.

With reference to FIG. 1, a schematic illustration of an exemplary engine, such as a gas turbine engine 10 is shown, which includes a gearbox 12. The gearbox 12 is coupled to the gas turbine engine 10 with a mounting system 100 according to various embodiments. As will be discussed, the mounting system 100 reduces the transfer of loads to the gearbox 12 experienced during a vibration of the gas turbine engine 10. It should be noted that while the mounting system 100 is discussed herein as being used to couple the gearbox 12 to the gas turbine engine 10, the mounting system 100 can be employed to couple together various components. Moreover, the mounting system 100 may be employed to couple the gearbox 12 to any suitable engine, such as a turbojet engine, an auxiliary power unit (APU), etc. Thus, the following description is merely one exemplary use of the mounting system 100. Moreover, while the gas turbine engine 10 is described herein as being used with a vehicle, such as an aircraft 8, it will be understood that the gas turbine engine 10 may be used with any suitable platform, whether mobile or stationary.

In this example, the gas turbine engine 10 includes a fan section 14, a compressor section 16, a combustion section 18, a turbine section 20, and an exhaust section 22. The fan section 14 includes a fan 24 mounted on a rotor 26 that draws air into the gas turbine engine 10 and accelerates it. A fraction of the accelerated air exhausted from the fan 24 is directed through an outer (or first) bypass duct 28 and the remaining fraction of air exhausted from the fan 24 is directed into the compressor section 16.

In the embodiment of FIG. 1, the compressor section 16 includes a compressor 32 that raises the pressure of the air directed into it from the fan section 14. However, in other embodiments, the number of compressors in the compressor section 16 may vary. In the depicted embodiment, the compressor 32 raises the pressure of the air and directs the high pressure air into a combustor 36. The fraction of air that entered the first bypass duct 28 enters a second bypass duct 34.

In the combustion section 18, which includes the combustor 36, the high pressure air is mixed with fuel and combusted. The high-temperature combusted air is then directed into the turbine section 20. The turbine section 20 includes one or more turbines disposed in axial flow series, for example, a high pressure turbine 38 and a low pressure turbine 42. However, it will be appreciated that the number of turbines, and/or the configurations thereof, may vary. In this embodiment, the high-temperature combusted air from the combustion section 18 expands through and rotates each turbine 38 and 42. The air is then exhausted through a mixing nozzle 44 where it is recombined with the bypass flow air in the exhaust section 22. As the turbines 38 and 42 rotate, each drives equipment in the gas turbine engine 10 via concentrically disposed shafts or spools. In one example, the high pressure turbine 38 drives the compressor 32 via a high pressure driveshaft 46 and the low pressure turbine 42 drives the fan 24 via a low pressure driveshaft 50. Generally, the high pressure driveshaft 46 and the low pressure driveshaft 50 are coaxially arranged along a longitudinal axis L of the gas turbine engine 10, and each of the high pressure driveshaft 46 and the low pressure driveshaft 50 have an axis of rotation R, which extends substantially parallel to and along the longitudinal axis L.

In the example of FIG. 1, the high pressure driveshaft 46 includes a gear 52. In this example, the gear 52 is a bevel gear, having a plurality of bevel gear teeth. The gear 52 is coupled to a towershaft 54 and drives the towershaft 54. In one example, the towershaft 54 includes a first end 54a and a second end 54b. The first end 54a includes a gear 56, which in this example, comprises a bevel gear. The gear 56 includes a plurality of bevel gear teeth, which are meshingly coupled to or engaged with the plurality of bevel gear teeth of the gear 52. The engagement of gear 56 with gear 52 transfers torque from the high pressure driveshaft 46 to the towershaft 54, and thus, drives or rotates the towershaft 54. The towershaft 54 is generally coupled to the gear 52 such that the towershaft 54 extends along an axis of rotation TR, which is substantially transverse to the axis of rotation R of the high pressure driveshaft 46. One or more bearings or supports may be coupled to the towershaft 54 at or near the first end 54a to support the towershaft 54 for rotation with the gear 56.

The second end 54b of the towershaft 54 is coupled to the gearbox 12. In one example, the second end 54b of the towershaft 54 includes a sleeve 55. The sleeve 55 is coupled about the second end 54b via splined coupling, for example, although any suitable joining technique may be employed such that the sleeve 55 rotates in unison with the towershaft 54. The sleeve 55 may be supported for rotation by a bearing 57, which is disposed in a housing 59. The housing 59 couples the second end 55b of the sleeve 55 to the gearbox 12 and the bearing 57 supports the sleeve 55 for rotation. The sleeve 55 further includes a gear 58, such as a bevel gear. The gear 58 is disposed at a second end 55b of the sleeve 55, and includes a plurality of bevel gear teeth. The plurality of bevel gear teeth are coupled about a perimeter or circumference of the gear 58. The gear 58 is coupled to a bevel gear contained within the gearbox 12. Generally, the gear 58 transfers torque from the sleeve 55 and the towershaft 54 to the gearbox 12 to drive various components coupled to the gearbox 12. In one example, the gearbox 12 is mounted within a nacelle N of the gas turbine engine 10.

Figure 1A:
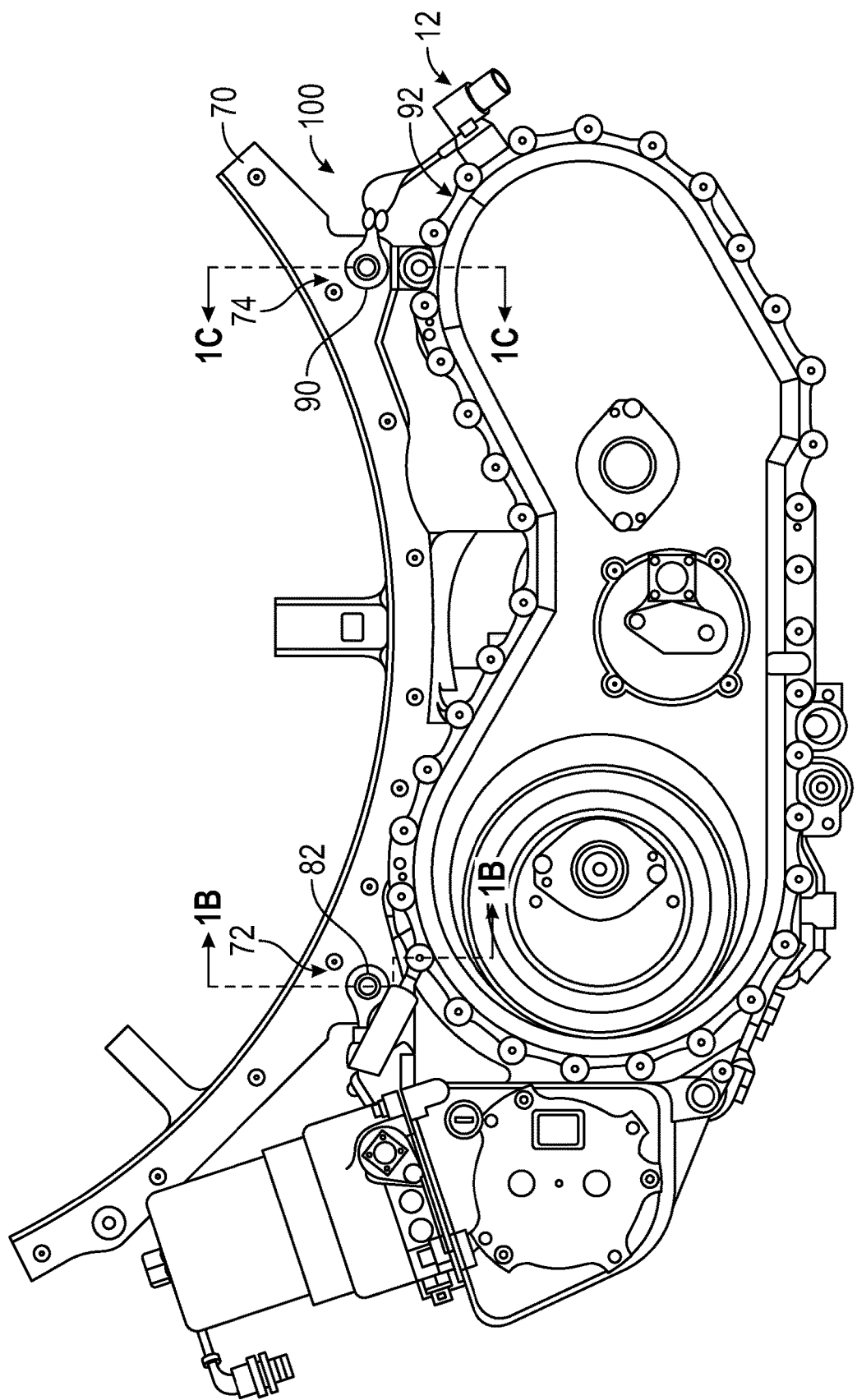
FIG. 1A is an aft end view of the gearbox of FIG. 1 coupled to the gas turbine engine in accordance with the various teachings of the present disclosure.
Figure 1B:
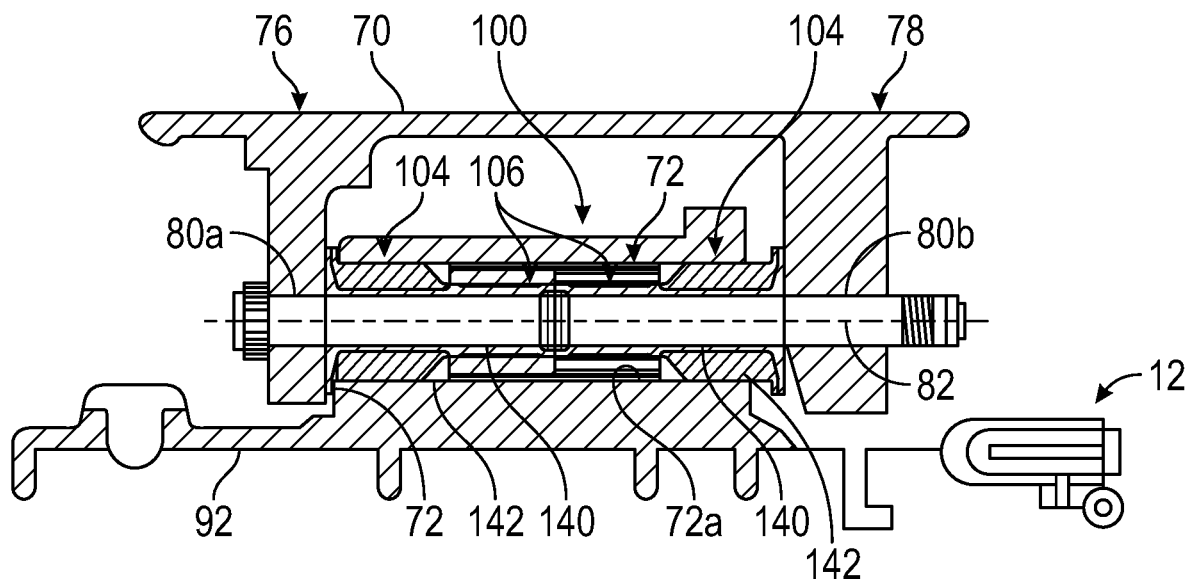
FIG. 1B is a cross-sectional view of a first, left mount for coupling the gearbox to the gas turbine engine, taken along line 1B-1B of FIG. 1A.
Figure 1C:
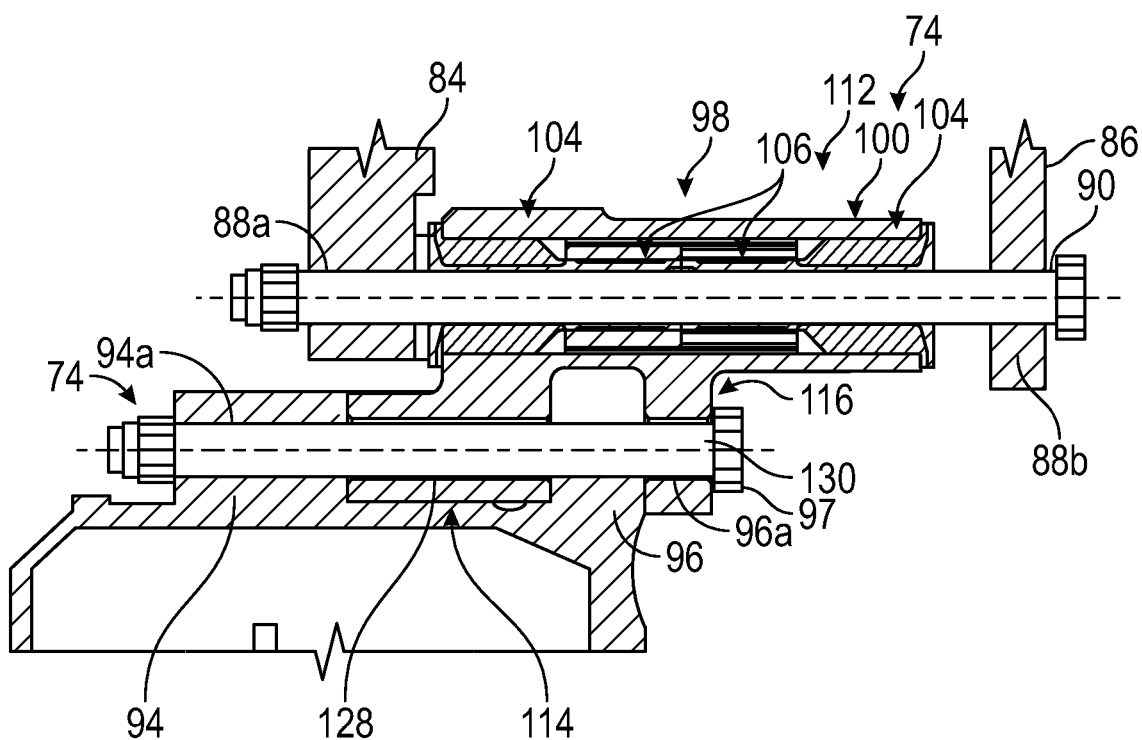
FIG. 1C is a cross-sectional view of a second, right mount for coupling the gearbox to the gas turbine engine, taken along line 1C-1C of FIG. 1A.

As shown in FIG. 1A, a first or left mount 72 and a second or right mount 74 each cooperate with the front frame 70 of the gas turbine engine 10 to couple the gearbox 12 to the gas turbine engine 10. As will be discussed, the left mount 72 and the right mount 74 each includes a mounting system 100, which couples the gearbox 12 to the gas turbine engine 10. In one example, with reference to FIG. 1B, the front frame 70 includes a first left flange or lug 76 spaced apart from a second left flange or lug 78. Each of the first left lug 76 and the second left lug 78 define a respective left coupling bore 80a, 80b, which are coaxially aligned. The left mount 72 is coupled to the first left lug 76 and the second left lug 78 via a mechanical fastener, such as a bolt 82, that is received through the left coupling bores 80a, 80b and the left mount 72. With reference to FIG. 1C, the front frame 70 also includes a first right flange or lug 84 and a second right flange or lug 86. Each of the first right lug 84 and the second right lug 86 extend radially outward from the front frame 70. Each of the first right lug 84 and the second right lug 86 define a respective right coupling bore 88a, 88b. The right coupling bores 88a, 88b are coaxially aligned for coupling to the right mount 74. The first right lug 84 and the second right lug 86 are spaced apart axially to enable a portion of the right mount 74 to be received between the first right lug 84 and the second right lug 86. A mechanical fastener, including but not limited to a bolt 90 may be used to couple the right mount 74 to the front frame 70.

With reference to FIG. 1A, the gearbox 12 includes a gearbox housing 92 that substantially surrounds the gears associated with the gearbox 12. The gearbox housing 92 also includes the left mount 72 and the right mount 74. With reference to FIG. 1B, the left mount 72 defines a left gearbox coupling bore 72a that is coaxially aligned with the left coupling bores 80a, 80b to receive the bolt 82. With reference to FIG. 1C, the right mount 74 defines a first right gearbox flange or lug 94, a second right gearbox flange or lug 96 and a mounting housing 98. The first right gearbox lug 94 and the second right gearbox lug 96 each extend radially outward from the gearbox housing 92 and define a respective right gearbox bore 94a, 96a. The right gearbox bores 94a, 96a are coaxially aligned for receiving a mechanical fastener, such as a bolt 97, to couple the mounting housing 98 to the first right gearbox lug 94 and the second right gearbox lug 96. The first right gearbox lug 94 and the second right gearbox lug 96 are spaced apart axially to enable a portion of the mounting housing 98 to be received between the first right gearbox lug 94 and the second right gearbox lug 96. Each of the left mount 72 and the right mount 74 includes the mounting system 100 that is coupled or positioned about the bolt 82, 90 to reduce the transfer of loads to the gearbox 12 experienced during a vibration of the gas turbine engine 10. In this example, the left mount 72 includes the mounting system 100 coupled to the left gearbox coupling bore 72a, and the right mount 74 includes the mounting system 100 coupled to the mounting housing 98 for coupling the gearbox 12 to the gas turbine engine 10.

Figure 2:
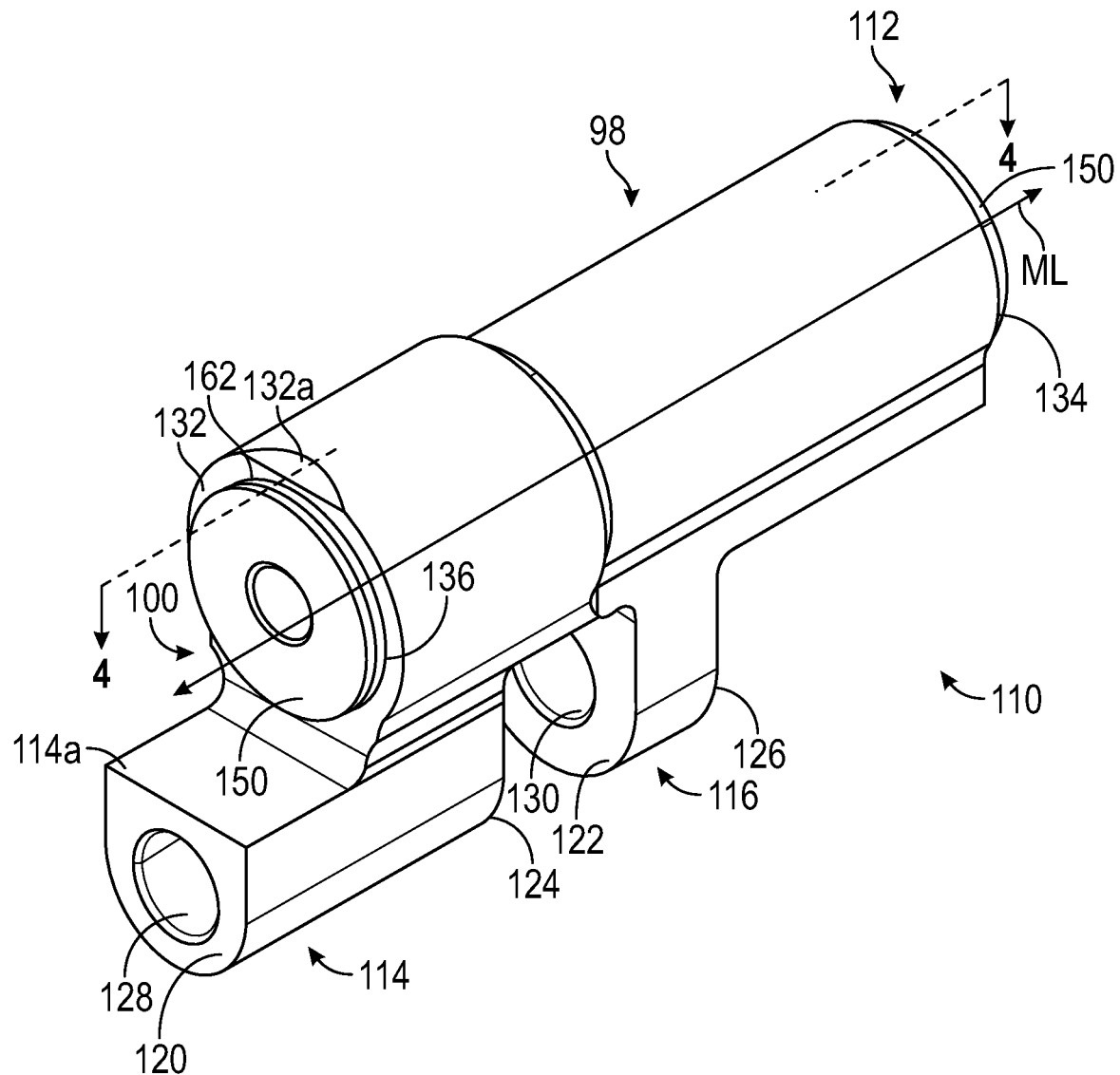
FIG. 2 is a perspective view of a mounting housing including the mounting system of FIG. 1.
Figure 3:
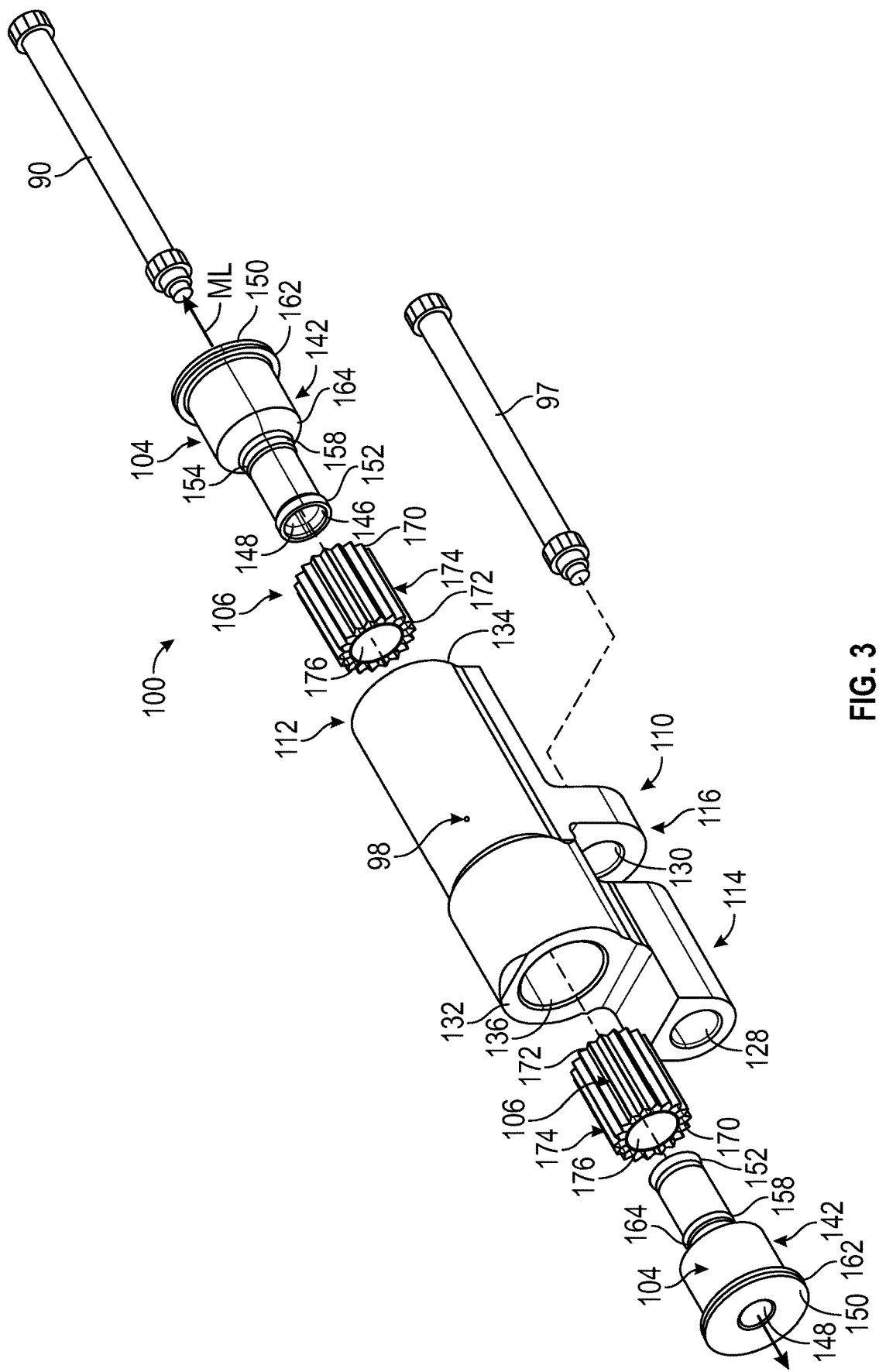
FIG. 3 is an exploded view of the mounting system from the mounting housing of FIG. 2.

With reference to FIGS. 2 and 3, the mounting housing 98 and the mounting system 100 associated with the right mount 74 is shown in greater detail. It should be noted that the mounting system 100 associated with the left mount 72 is the same as the mounting system 100 associated with the right mount 74 and for ease of description the mounting system 100 associated with the right mount 74 will be discussed in detail herein with the understanding that the mounting system 100 associated with the left mount 72 is the same. In one example, the mounting system 100 includes at least one or a pair of first bushings 104 (FIG. 3) and at least one or a pair of second, corrugated bushings 106 (FIG. 3).

The mounting housing 98 is monolithic, one-piece, or unitary and is composed of a metal or metal alloy. The mounting housing 98 may be cast, forged, machined, additively manufactured, etc. The mounting housing 98 includes a gearbox coupling portion 110 and an engine coupling portion 112. With reference to FIG. 2, the gearbox coupling portion 110 includes a first gearbox coupling flange 114 and a second gearbox coupling flange 116. The gearbox coupling flanges 114, 116 extend from the engine coupling portion 112. The gearbox coupling flanges 114, 116 are substantially cylindrical, but the gearbox coupling flanges 114, 116 may have any desired shape. The first gearbox coupling flange 114 is spaced a distance apart from the second gearbox coupling flange 116 along a mounting longitudinal axis ML of the mounting system 100. The mounting longitudinal axis ML is parallel to the longitudinal axis L (FIG. 1) of the gas turbine engine 10. Generally, each of the gearbox coupling flanges 114, 116 are spaced apart to enable the first right gearbox lug 94 and the second right gearbox lug 96 to be received between the gearbox coupling flanges 114, 116. Each of the gearbox coupling flanges 114, 116 includes a respective first coupling flange end 120, 122 opposite a respective second coupling flange end 124, 126 and a respective coupling bore 128, 130. The first coupling flange end 120 of the first gearbox coupling flange 114 is coupled proximate the first right gearbox lug 94 and the second right gearbox lug 96 is coupled between the second coupling flange end 124 of the first gearbox coupling flange 114 and the first coupling flange end 122 of the second gearbox coupling flange 116 when the mounting housing 98 is coupled to the gearbox 12 (FIG. 1). The coupling bores 128, 130 each extends through the respective gearbox coupling flange 114, 116 from the first coupling flange end 120, 122 to the second coupling flange end 124, 126. The coupling bores 128, 130 of the respective gearbox coupling flange 114, 116 are coaxially aligned with each of the right gearbox bores 94a, 96a of the first right gearbox lug 94 and the second right gearbox lug 96 to enable the bolt 97 to be inserted through the coupling bores 128, 130 and the right gearbox bores 94a, 96a to couple the gearbox 12 to the right mount 74 (FIG. 1). In this example, the first gearbox coupling flange 114 extends for a distance along the mounting longitudinal axis ML that is different and greater than a distance the second gearbox coupling flange 116 extends along the mounting longitudinal axis ML.

Figure 4:
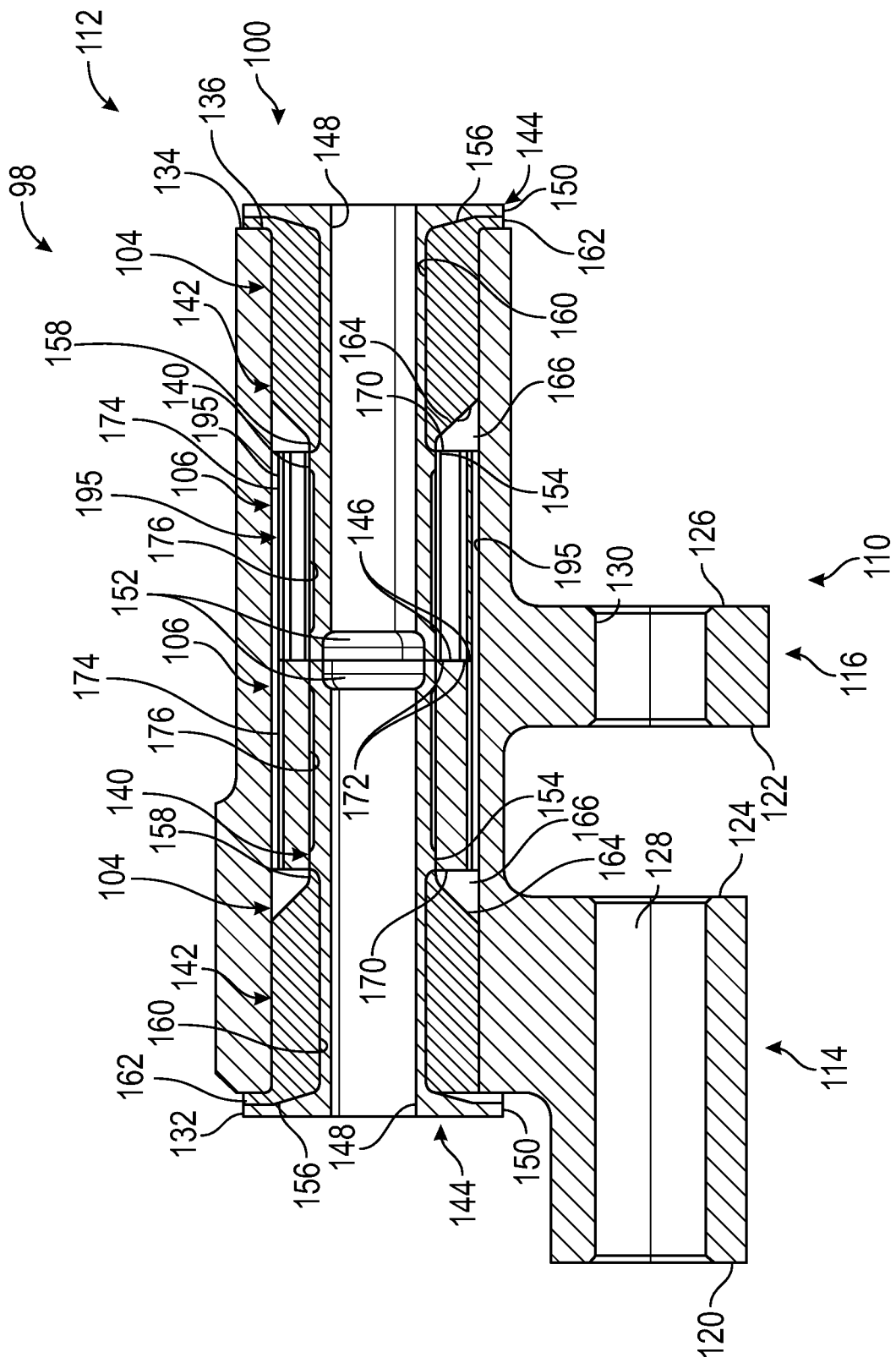
FIG. 4 is a cross-sectional view of the mounting housing and the mounting system, taken along line 4-4 of FIG. 2.

In one example, the gearbox coupling portion 110 extends forward of or axially in front of the engine coupling portion 112. The first gearbox coupling flange 114 may include a shelf or flat surface 114a, which enables the bolt 97 to be inserted through the engine coupling portion 112. Thus, generally, the engine coupling portion 112 may be recessed relative to the gearbox coupling portion 110. The engine coupling portion 112 is substantially cylindrical. The engine coupling portion 112 includes a first engine coupling end 132 opposite a second engine coupling end 134, and a coupling bore or engine coupling bore 136. In one example, the first engine coupling end 132 includes a notched surface 132a to assist in coupling the bolt 90 to the engine coupling portion 112. The engine coupling bore 136 is defined to extend through the engine coupling portion 112 from the first engine coupling end 132 to the second engine coupling end 134. The engine coupling bore 136 is spaced apart from and offset from the right gearbox bores 94a, 96a. With reference to FIG. 4, the engine coupling bore 136 is sized to receive the pair of first bushings 104 and the pair of corrugated bushings 106. In the example of the left mount 72, the pair of first bushings 104 are each received within the left gearbox coupling bore 72a (FIG. 1B).

The pair of first bushings 104 each include a sleeve 140 and a damping member 142. The sleeve 140 is composed of a metal or metal alloy, and is cast, forged, machined, additively manufactured, etc. The sleeve 140 extends from a first sleeve end 144 to an opposite second sleeve end 146. The sleeve 140 defines a sleeve bore 148, which is defined through the sleeve 140 from the first sleeve end 144 to the second sleeve end 146. In this example, the pair of first bushings 104 are arranged within the engine coupling bore 136 so as to be symmetric about an axis that is perpendicular to the mounting longitudinal axis ML. Stated another way, the second sleeve ends 146 of the first bushings 104 are adjacent to or in contact with each other. The first sleeve end 144 includes a sleeve flange 150, which extends about a perimeter or circumference of the sleeve 140. The sleeve flange 150 is proximate or adjacent to the respective one of the engine coupling ends 132, 134 when the first bushings 104 are coupled to the engine coupling bore 136. Generally, a majority of an outer perimeter of the sleeve 140 (from the sleeve flange 150 to the second sleeve end 146) faces the engine coupling bore 136 when the first bushings 104 are coupled to the engine coupling bore 136. The sleeve flange 150 has a diameter, which is different and greater than a diameter of the second sleeve end 146. The diameter of the sleeve flange 150 is also different and greater than a diameter of a majority of the damping member 142. The sleeve flange 150 assists in coupling the damping member 142 to the sleeve 140. The second sleeve end 146 includes a collar 152. The collar 152 extends radially outward at the second sleeve end 146 to provide a contact surface for the respective corrugated bushing 106. Between the first sleeve end 144 and the second sleeve end 146, the sleeve 140 includes a second collar 154. The second collar 154 extends radially outward from the sleeve 140 proximate the damping member 142. The second collar 154 provides a contact surface for the respective corrugated bushing 106, and also assists in the formation of the damping member 142 onto the sleeve 140 by providing a locating feature. The sleeve bore 148 is sized to retain the bolt 90, and each of the sleeve bores 148 are coaxially aligned when the first bushings 104 are coupled to the engine coupling portion 112.

The damping member 142 is formed onto the sleeve 140. The damping member 142 is composed of a polymer based material, including, but not limited to an elastomer, such as acrylonitrile butadiene (Nbr) Rubber. In one example, the damping member 142 is overmolded onto an outer perimeter of the sleeve 140 at the first sleeve end 144 between the sleeve flange 150 and the second collar 154. In this example, the damping member 142 is substantially cylindrical and forms an elastomeric bushing. The damping member 142 has a first damping end 156 opposite a second damping end 158, and defines a damping bore 160 that extends from the first damping end 156 to the second damping end 158. The first damping end 156 includes a damping flange 162, which extends radially outward at the first damping end 156. Generally, the damping flange 162 has a diameter that is about equal to the diameter of the sleeve flange 150. The damping flange 162 contacts the respective one of the first engine coupling end 132 and the second engine coupling end 134 of the engine coupling portion 112 when the first bushings 104 are coupled to the engine coupling portion 112. The second damping end 158 includes a taper 164. The taper 164 transitions a diameter of the damping member 142 toward the diameter of the sleeve 140 proximate the second sleeve end 146. By providing the damping member 142 with the taper 164, a volume 166 is defined between the damping member 142 and the engine coupling bore 136 when the first bushings 104 are coupled to the engine coupling portion 112. The damping bore 160 surrounds the sleeve 140 and is defined by the formation of the damping member 142 about the sleeve 140.

With reference to FIG. 3, the corrugated bushings 106 are each received within the engine coupling bore 136 of the mounting housing 98 or the left gearbox coupling bore 72a of the left mount 72 (FIG. 1B). Each of the corrugated bushings 106 include a first bushing end 170 opposite a second bushing end 172, a plurality of corrugations 174 and define a bushing bore 176 that extends from the first bushing end 170 to the second bushing end 172. Each of the corrugated bushings 106 are composed of a metal or metal alloy, and may be cast, forged, stamped, additively manufactured, etc. The corrugated bushings 106 may also be composed of a polymer based material, if desired, and may be molded, additively manufactured, etc. Each of the corrugated bushings 106 may be formed so as to be monolithic, one-piece, or unitary, but the corrugations 174 may be formed separately and coupled about a bushing sleeve 178 that defines the bushing bore 176 to form the corrugated bushings 106, if desired. The corrugated bushing 106 is substantially cylindrical. With reference to FIG. 4, the first bushing end 170 is coupled adjacent to the damping member 142 and is coupled to the second collar 154 when the mounting system 100 is assembled. The second bushing end 172 is coupled to the collar 152 when the mounting system 100 is assembled.

Figure 5:
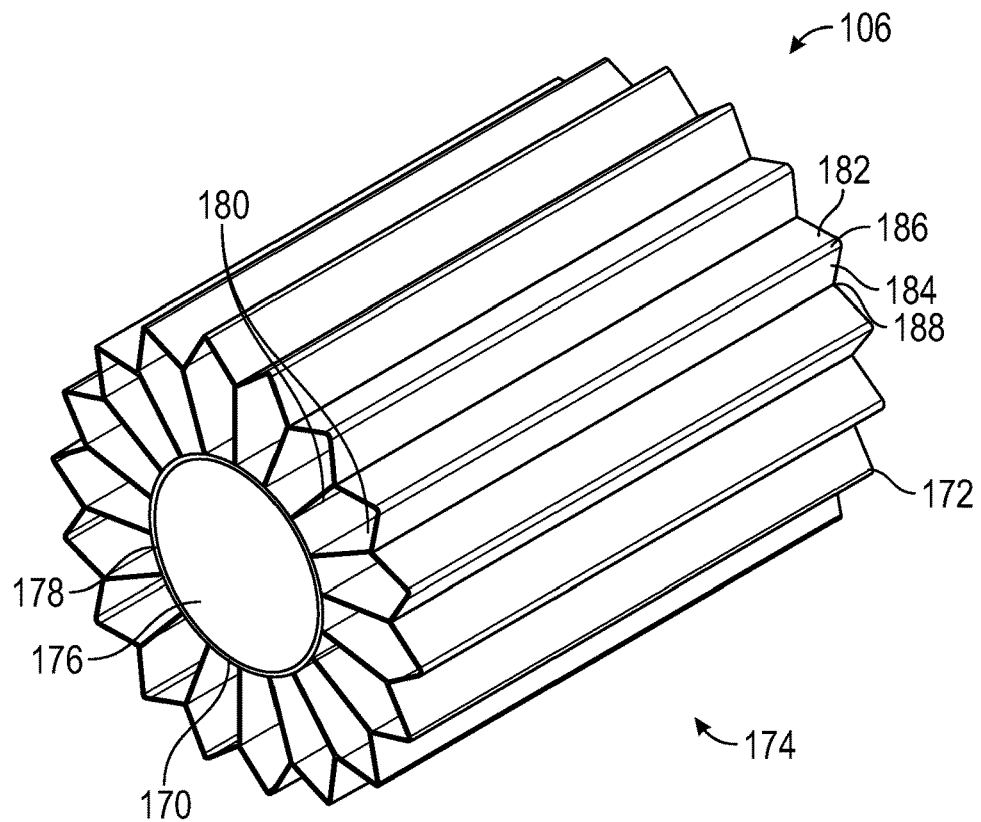
FIG. 5 is a perspective view of an exemplary corrugated bushing for use with the mounting system of FIG. 1.
Figure 5A:
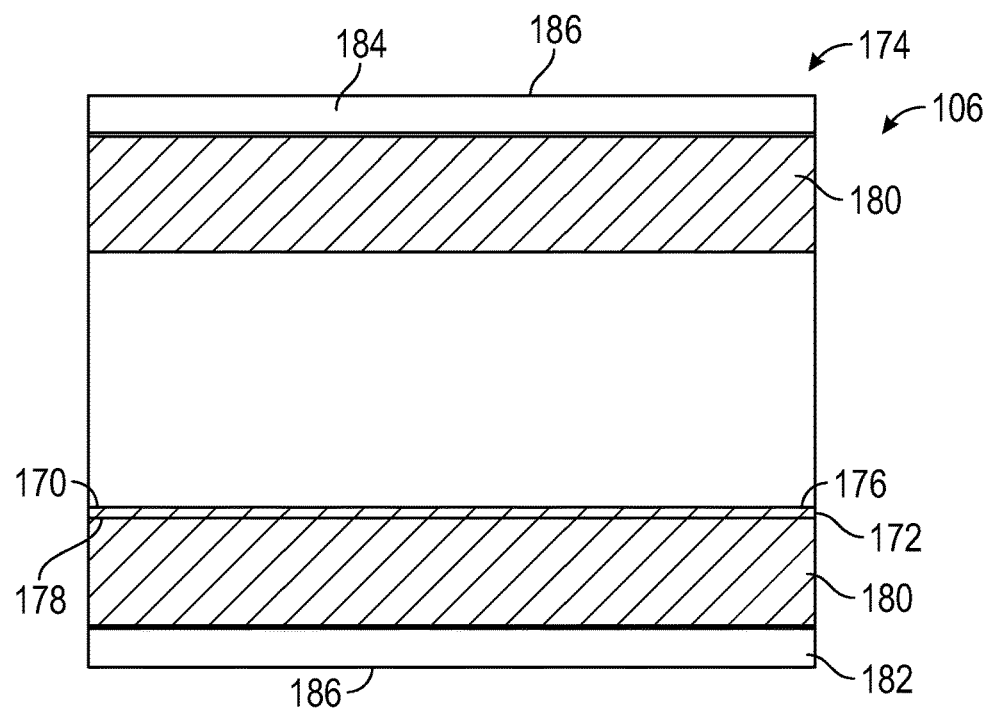
FIG. 5A is a cross-section of the corrugated bushing of FIG. 5, taken along line 5A-5A of FIG. 6.
Figure 6:
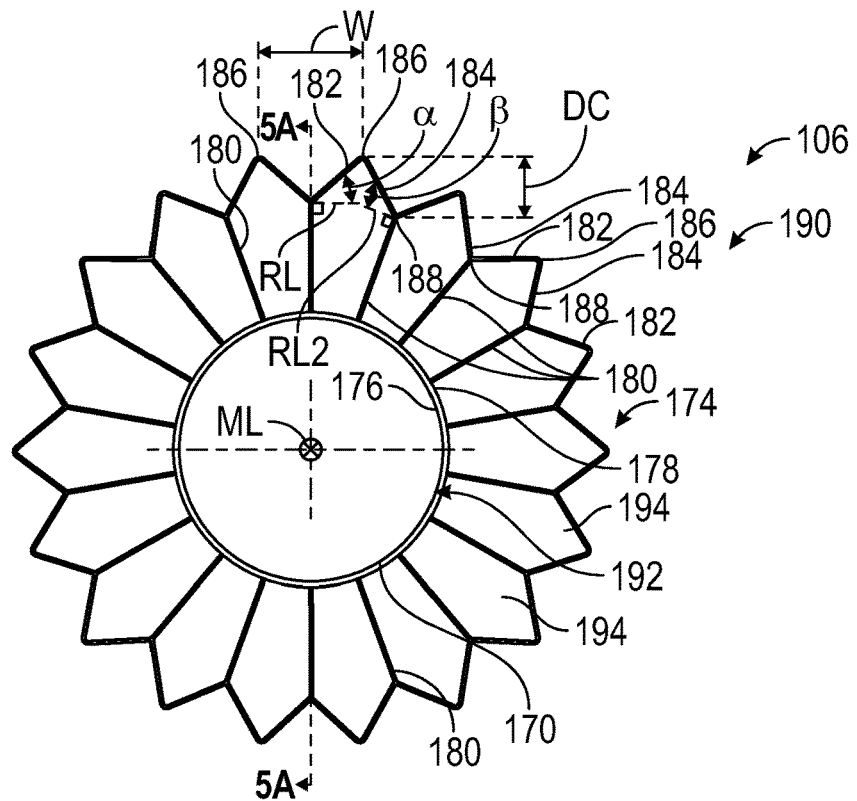
FIG. 6 is an end view of the corrugated bushing of FIG. 5.

With reference to FIGS. 5 and 5A, one of the corrugated bushings 106 is shown in greater detail. It should be noted that while one of the corrugated bushings 106 is shown in detail herein, both of the corrugated bushings 106 are the same. The corrugations 174 define an exterior surface of each of the corrugated bushings 106, and extend from the first bushing end 170 to the second bushing end 172. With reference to FIG. 5, the corrugations 174 extend about a perimeter or circumference of the corrugated bushing 106 such that the corrugations 174 are defined in a tangential direction. The corrugations 174 enable the corrugated bushing 106 to flex upon an application of a load above a predetermined threshold. In this example, with reference to FIG. 6, the corrugations 174 are composed of a plurality of sidewalls 180, a plurality of first ramp surfaces 182 and a plurality of second ramp surfaces 184. In this example, the sidewalls 180 extend radially and axially from the bushing sleeve 178 that surrounds and defines the bushing bore 176. The sidewalls 180 are spaced apart about the perimeter or circumference of the bushing bore 176. In one example, the sidewalls 180 are planar, straight, or flat, and have a first end coupled to or integrally formed with the bushing sleeve 178 and an opposite end coupled to or integrally formed with a respective one of the ramp surfaces 182, 184.

Each of the first ramp surfaces 182 extends at an angle relative to the respective sidewall 180. An angle α is defined between the respective first ramp surface 182 and a reference line RL that is perpendicular to the respective sidewall 180. In one example, the angle α is an acute angle, and is about 45 degrees. Each of the first ramp surfaces 182 extends straight from the respective sidewall 180 at the angle α, and is coupled to or integrally formed with a respective one of the second ramp surfaces 184. Each of the second ramp surfaces 184 extends at an angle relative to the respective sidewall 180. An angle β is defined between the respective second ramp surface 184 and a second reference line RL2 that is perpendicular to the respective sidewall 180. In one example, the angle β is an acute angle, and is about negative 45 degrees. Generally, the angle α and the angle β are equal and opposite angles.

Each of the second ramp surfaces 184 extends straight from the respective sidewall 180 at the angle β, and is coupled to or integrally formed with a respective one of the first ramp surfaces 182. Each of the respective first ramp surfaces 182 and the second ramp surfaces 184 are coupled together at a peak 186. The peaks 186 are spaced apart by a pitch or width W, which is the pitch or the width W of the corrugations 174. The line at which the respective sidewall 180 is coupled to or integrally formed with the respective first ramp surface 182 and the second ramp surface 184 defines a trough 188 of the corrugations 174. A depth DC of the corrugations 174 is defined as a distance between the peak 186 and the trough 188. In this example, the depth DC and the width W of the corrugations 174 is the same about the perimeter or circumference of the corrugated bushing 106, but in other examples, the width W and/or the depth DC may vary about the circumference. The alternating of the peaks 186 and the troughs 188 about the perimeter of the corrugated bushing 106 defines a plurality of undulations spaced apart about a bushing outer perimeter 190 in the tangential direction.

In this example, each of the corrugated bushings 106 has the bushing outer perimeter 190 defined by the corrugations 174, and a bushing inner perimeter 192 defined by the bushing bore 176. The spaced apart sidewalls 180 and the ramp surfaces 182, 184 of the corrugations 174 cooperate with the bushing sleeve 178 to define at least one or a plurality of chambers 194 that are spaced apart about the perimeter or circumference of the corrugated bushing 106. In this example, each of the chambers 194 are hollow, however, in other examples, the chambers 194 may be solid or porous. Each chamber 194 is defined between the bushing outer perimeter 190 and the bushing inner perimeter 192. Each chamber 194 is also discrete or not in communication with an adjacent chamber 194. The chambers 194 assist in reducing a stiffness associated with the corrugated bushing 106.

Generally, the corrugated bushings 106 have a stiffness that is about equal to a stiffness of the damping member 142. The stiffness of the corrugated bushings 106 is predetermined such that the corrugated bushings 106 are inhibited from becoming a primary load path for load transfer between the gearbox 12 and the gas turbine engine 10. In one example, each of the corrugated bushings 106 has a stiffness of about 100 pound force per inch to about 60000 pound force per inch, while the damping member 142 has a stiffness of about 100 pound force per inch to about 60000 pound force per inch based on the operating conditions associated with the gas turbine engine 10. By providing the corrugated bushing 106 with the stiffness about equal to than the stiffness of the damping member 142, the corrugated bushing 106 may deflect to assist in sharing a load introduced to the mounting system 100 by a vibration of the gas turbine engine 10. This reduces an amount of load experienced by the damping member 142, which in turn, reduces an amount of compression of the damping member 142. The reduction in the amount of compression of the damping member 142 enables the damping member 142 to provide higher damping, which reduces an amount of load transferred from the mounting system 100 to the gearbox 12. The reduction in the amount of compression of the damping member 142 also improves a life expectancy of the damping member 142.

The bushing sleeve 178 defines the bushing bore 176. The bushing sleeve 178 is cylindrical, and the corrugations 174 are coupled to the bushing sleeve 178 on a surface opposite the bushing bore 176. With reference back to FIG. 4, the bushing bore 176 is sized to receive the sleeve 140 proximate and at the second sleeve end 146 such that the respective corrugated bushing 106 is coupled about an outer perimeter or circumference of the sleeve 140 between the damping member 142 and the second sleeve end 146. Generally, the bushing bore 176 coupled to the sleeve 140 so as to extend from the collar 152 to the second collar 154. The corrugated bushings 106 extend for a distance defined between the bushing inner perimeter 192 and the bushing outer perimeter 190 that is sized to enable the corrugated bushings 106 to be positioned between the sleeve 140 and a sidewall of the engine coupling bore 136 or the left gearbox coupling bore 72a (FIG. 1B). In one example, the distance is equal to or less than about 0.23 inches (in.). In one example, the distance is sized to define or create a gap 195 between the bushing outer perimeter 190 and the engine coupling bore 136 or the left gearbox coupling bore 72a (FIG. 1B). The gap 195 inhibits the corrugated bushings 106 from becoming a load bearing member during a normal operation of the gas turbine engine 10. When the gas turbine engine 10 experiences vibrations, the gap 195 is closed and the corrugated bushings 106 become part of the load path. In other embodiments, the bushing outer perimeter 190 may contact the engine coupling bore 136 or the left gearbox coupling bore 72a (FIG. 1B).

Figure 7:
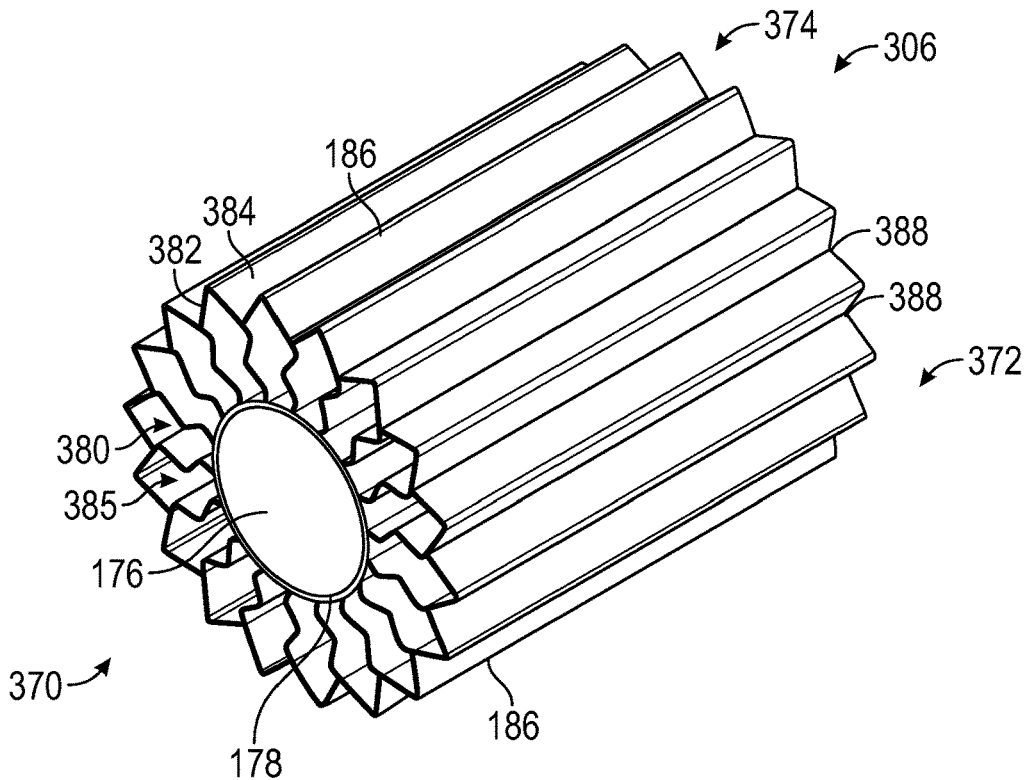
FIG. 7 is a perspective view of another exemplary corrugated bushing for use with the mounting system of FIG. 1.
Figure 8:
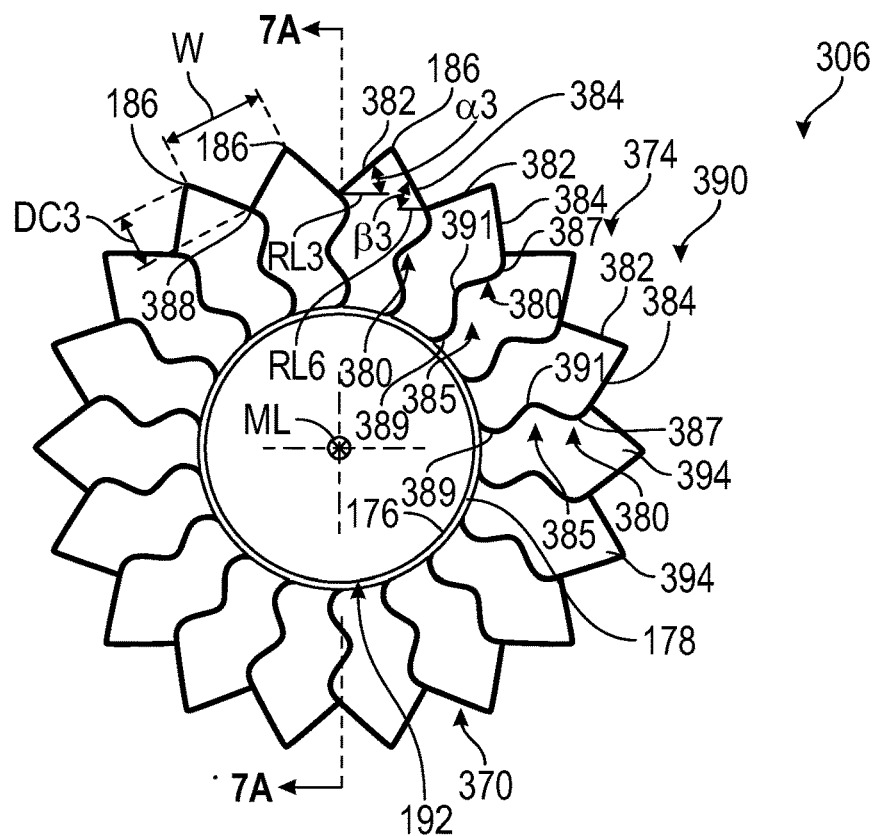
FIG. 8 is an end view of the corrugated bushing of FIG. 7.

It should be noted that in other embodiments, the corrugated bushings 106 may be configured differently to share the load with the damping members 142 of the first bushings 104. For example, with reference to FIGS. 7 and 8, a corrugated bushing 306 is shown for use with the mounting system 100. As the corrugated bushing 306 includes components that are the same or similar to components of the corrugated bushing 106 discussed with regard to FIGS. 1-6, the same reference numerals will be used to denote the same or similar components. In the example of FIG. 7, the mounting system 100 would include a pair of the corrugated bushings 306, which are arranged and coupled to the sleeves 140 of the respective first bushings 104 as discussed with regard to FIGS. 1-6. It should be noted that while one of the corrugated bushings 306 is shown in detail in FIG. 7, both of the corrugated bushings 306 for use with the mounting system 100 are the same.

The corrugated bushings 306 are each received within the engine coupling bore 136 (FIG. 4) of the mounting housing 98 or the left gearbox coupling bore 72a of the left mount 72 (FIG. 1B). Each of the corrugated bushings 306 include a first bushing end 370 opposite a second bushing end 372, a plurality of corrugations 374 and define the bushing bore 176 that extends from the first bushing end 370 to the second bushing end 372. Each of the corrugated bushings 306 are composed of a metal or metal alloy, and may be cast, forged, stamped, additively manufactured, etc. The corrugated bushings 306 may also be composed of a polymer based material, if desired, and may be molded, additively manufactured, etc. Each of the corrugated bushings 306 may be formed so as to be monolithic, one-piece, or unitary, but the corrugations 374 may be formed separately and coupled about the bushing sleeve 178 that defines the bushing bore 176 to form the corrugated bushings 306, if desired. The corrugated bushing 306 is substantially cylindrical. The first bushing end 370 is coupled adjacent to the damping member 142 and is coupled to the second collar 154 when the mounting system 100 is assembled (FIG. 4). The second bushing end 372 is coupled to the collar 152 when the mounting system 100 is assembled (FIG. 4).

Figure 7A:
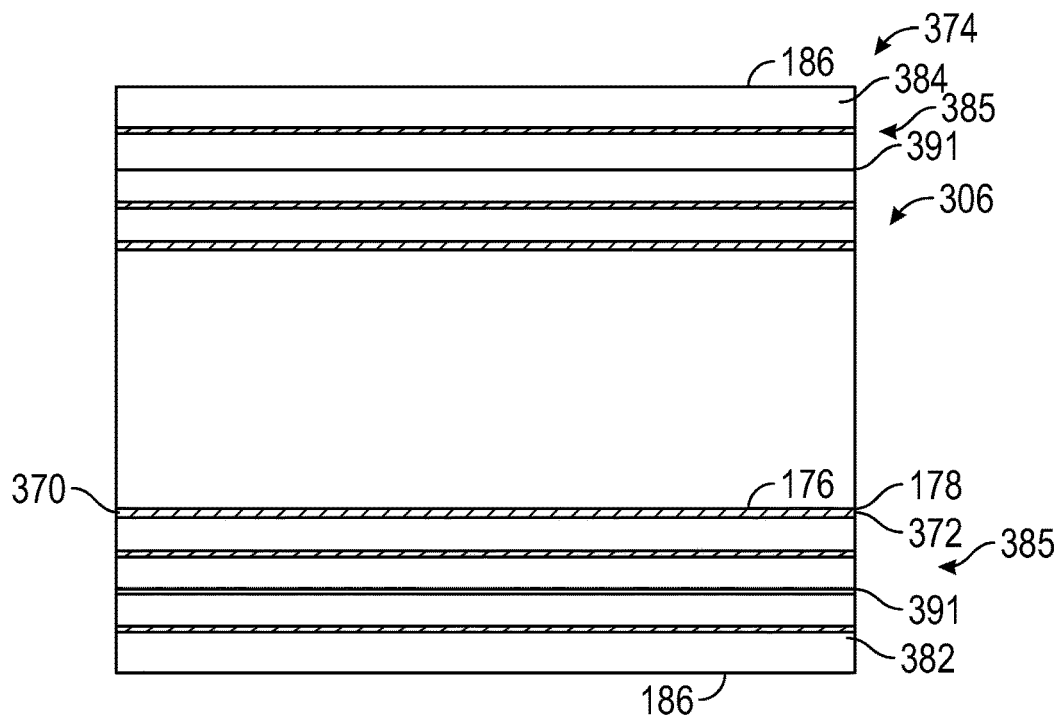
FIG. 7A is a cross-section of the corrugated bushing of FIG. 7, taken along line 7A-7A of FIG. 8.

With reference to FIGS. 7 and 7A, the corrugations 374 define an exterior surface of the corrugated bushing 306, and extend from the first bushing end 370 to the second bushing end 372. The corrugations 374 extend about a perimeter or circumference of the corrugated bushing 306 and undulate in a tangential direction. The corrugations 374 enable the corrugated bushing 306 to flex upon an application of a load above a predetermined threshold. In this example, with reference to FIG. 8, the corrugations 374 are composed of a plurality of sidewalls 380, a plurality of first ramp surfaces 382 and a plurality of second ramp surfaces 384. In this example, the sidewalls 380 extend radially and axially from the bushing sleeve 178 that surrounds and defines the bushing bore 176. The sidewalls 380 are spaced apart about the perimeter or circumference of the bushing bore 176. In one example, the sidewalls 380 are wavy or define at least one or a plurality of undulations 385. In this example, the plurality of undulations 385 are defined by a first sidewall peak 387, a second sidewall peak 389 and a sidewall trough 391 in a clockwise direction. The sidewall trough 391 is defined between the first sidewall peak 387 and the second sidewall peak 389. It should be noted that the plurality of undulations 385 may be defined differently, if desired, and for example, may include two sidewall troughs separated by a sidewall peak. Each of the sidewalls 380 has a first end coupled to or integrally formed with the bushing sleeve 178 and an opposite end coupled to or integrally formed with a respective one of the ramp surfaces 382, 384. The plurality of undulations 385 defined on the sidewalls 380 provide an additional reduction in stiffness of the corrugated bushing 306.

Each of the first ramp surfaces 382 extends at an angle relative to the respective sidewall 380. An angle α3 is defined between the respective first ramp surface 382 and a reference line RL3 that is perpendicular to a line that extends along an intersection of the respective sidewall 380 with the respective first ramp surface 382. In one example, the angle α3 is an acute angle, and is about 45 degrees. Each of the first ramp surfaces 382 extends straight from the respective sidewall 380 at the angle α3, and is coupled to or integrally formed with a respective one of the second ramp surfaces 384. Each of the second ramp surfaces 384 extends at an angle relative to the respective sidewall 380. An angle β3 is defined between the respective second ramp surface 384 and a second reference line RL6 that is perpendicular a line that extends along an intersection of the respective sidewall 380 with the respective second ramp surface 384. In one example, the angle β3 is an acute angle, and is about negative 45 degrees. Generally, the angle α3 and the angle β3 are equal and opposite angles.

Each of the second ramp surfaces 384 extends straight from the respective sidewall 380 at the angle β3, and is coupled to or integrally formed with a respective one of the first ramp surfaces 382. Each of the respective first ramp surfaces 382 and the second ramp surfaces 384 are coupled together at the peak 186. The peaks 186 are spaced apart by the pitch or width W, which is the pitch or the width W of the corrugations 374. The line at which the respective sidewall 380 is coupled to or integrally formed with the respective first ramp surface 382 and the second ramp surface 384 defines a trough 388 of the corrugations 374. A depth DC3 of the corrugations 374 is defined as a distance between the peak 186 and the trough 388. In this example, the depth DC3 and the width W of the corrugations 374 is the same about the perimeter or circumference of the corrugated bushing 306, but in other examples, the width W and/or the depth DC3 may vary about the circumference. The alternating of the peaks 186 and the troughs 388 about the perimeter of the corrugated bushing 306 defines a plurality of undulations spaced apart about a bushing outer perimeter 390 in the tangential direction.

In this example, each of the corrugated bushings 306 has a bushing outer perimeter 390 defined by the corrugations 374, and the bushing inner perimeter 192 defined by the bushing bore 176. The spaced apart sidewalls 380 and the ramp surfaces 382, 384 of the corrugations 374 cooperate with the bushing sleeve 178 to define at least one or a plurality of chambers 394 that are spaced apart about the perimeter or circumference of the corrugated bushing 306. In this example, each of the chambers 394 are hollow, however, in other examples, the chambers 394 may be solid or porous. Each chamber 394 is defined between the bushing outer perimeter 390 and the bushing inner perimeter 192. Each chamber 394 is also discrete or not in communication with an adjacent chamber 394. The chambers 394 assist in reducing a stiffness associated with the corrugated bushing 306.

Generally, the corrugated bushings 306 have a stiffness that is about equal to the stiffness of the damping member 142. The stiffness of the corrugated bushings 306 is predetermined such that the corrugated bushings 306 are inhibited from becoming a primary load path for load transfer between the gearbox 12 and the gas turbine engine 10. In one example, each of the corrugated bushings 306 has the stiffness of about 100 pound force per inch to about 60000 pound force per inch, while the damping member 142 has the stiffness of about 100 pound force per inch to about 60000 pound force per inch based on the operating conditions associated with the gas turbine engine 10. By providing the corrugated bushing 306 with the stiffness about equal to the stiffness of the damping member 142, the corrugated bushing 306 may deflect to assist in sharing a load introduced to the mounting system 100 by a vibration of the gas turbine engine 10. This reduces an amount of load experienced by the damping member 142, which in turn, reduces an amount of compression of the damping member 142. The reduction in the amount of compression of the damping member 142 enables the damping member 142 to provide higher damping, which reduces an amount of load transferred from the mounting system 100 to the gearbox 12. The reduction in the amount of compression of the damping member 142 also improves a life expectancy of the damping member 142.

The bushing sleeve 178 is cylindrical, and the corrugations 374 are coupled to the bushing sleeve 178 on a surface opposite the bushing bore 176. The bushing bore 176 is sized to receive the sleeve 140 proximate and at the second sleeve end 146 such that the respective corrugated bushing 306 is coupled about an outer perimeter or circumference of the sleeve 140 between the damping member 142 and the second sleeve end 146 (FIG. 4). Generally, the bushing bore 176 coupled to the sleeve 140 so as to extend from the collar 152 to the second collar 154. The corrugated bushings 306 extend for a distance defined between the bushing inner perimeter 192 and the bushing outer perimeter 390 that is sized to enable the corrugated bushings 306 to be positioned between the sleeve 140 and a sidewall of the engine coupling bore 136 (FIG. 4) or the left gearbox coupling bore 72a (FIG. 1B). In one example, the distance is equal to or less than about 0.23 inches (in.). In one example, the distance may be sized to define or create the gap 195 (FIG. 4) between the bushing outer perimeter 390 and the engine coupling bore 136 or the left gearbox coupling bore 72a (FIG. 1B). In other embodiments, the bushing outer perimeter 390 may contact the engine coupling bore 136 or the left gearbox coupling bore 72a (FIG. 1B).

Figure 9:
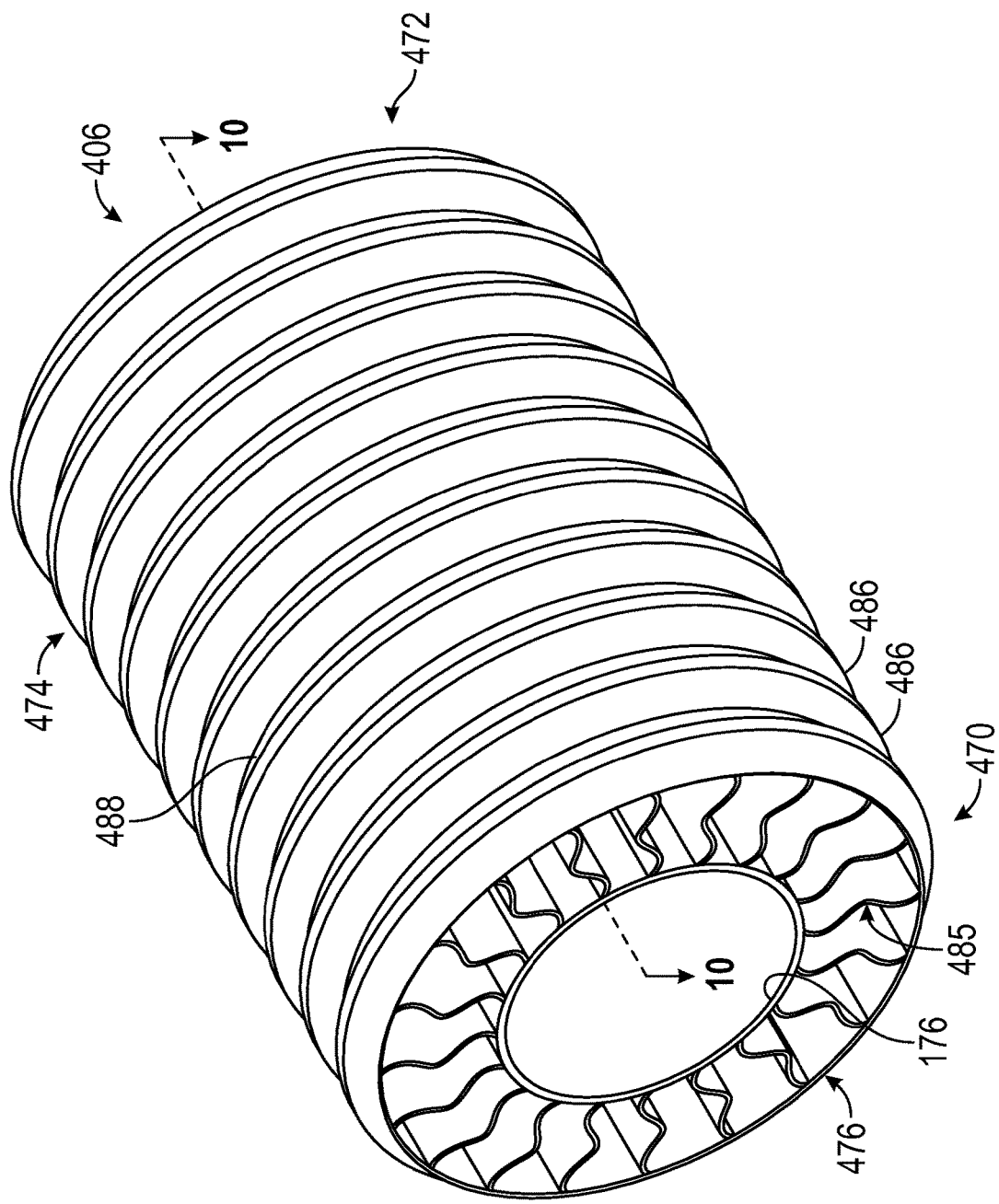
FIG. 9 is a perspective view of another exemplary corrugated bushing for use with the mounting system of FIG. 1.

It should be noted that in other embodiments, the corrugated bushings 106 may be configured differently to share the load with the damping members 142 of the first bushings 104. For example, with reference to FIGS. 9-11, a corrugated bushing 406 is shown for use with the mounting system 100. As the corrugated bushing 406 includes components that are the same or similar to components of the corrugated bushing 406 discussed with regard to FIGS. 1-6, the same reference numerals will be used to denote the same or similar components. In the example of FIG. 9, the mounting system 100 would include a pair of the corrugated bushings 406, which are arranged and coupled to the sleeves 140 of the respective first bushings 104 as discussed with regard to FIGS. 1-6. It should be noted that while one of the corrugated bushings 406 is shown in detail in FIG. 9, both of the corrugated bushings 406 for use with the mounting system 100 are the same.

The corrugated bushings 406 are each received within the engine coupling bore 136 (FIG. 4) of the mounting housing 98 or the left gearbox coupling bore 72a of the left mount 72 (FIG. 1B). Each of the corrugated bushings 406 include a first bushing end 470 opposite a second bushing end 472, a plurality of corrugations 474, a plurality of sidewalls 476 and define the bushing bore 176 that extends from the first bushing end 470 to the second bushing end 472. Each of the corrugated bushings 406 are composed of a metal or metal alloy, and may be cast, forged, stamped, additively manufactured, etc. The corrugated bushings 406 may also be composed of a polymer based material, if desired, and may be molded, additively manufactured, etc. Each of the corrugated bushings 406 may be formed so as to be monolithic, one-piece, or unitary, and or may be formed as multiple pieces and coupled together via welding, adhesives, etc., if desired. The corrugated bushing 406 is substantially cylindrical. The first bushing end 470 is coupled adjacent to the damping member 142 and is coupled to the second collar 154 when the mounting system 100 is assembled (FIG. 4). The second bushing end 472 is coupled to the collar 152 when the mounting system 100 is assembled (FIG. 4).

With reference to FIG. 9, the corrugations 474 define an exterior surface of each of the corrugated bushings 406, and extend from the first bushing end 470 to the second bushing end 472. The corrugations 474 extend about a perimeter or circumference of the corrugated bushing 406, and undulate in an axial direction or in a direction parallel to the mounting longitudinal axis ML. The corrugations 474 enable the corrugated bushing 406 to flex upon an application of a load above a predetermined threshold. In this example, with reference to FIG. 10, the corrugations 474 are defined along a substantially cylindrical sheet 481, and are composed of a plurality of first ramp surfaces 482 and a plurality of second ramp surfaces 484. Each of the first ramp surfaces 482 extends at an angle relative to the mounting longitudinal axis ML. An angle $\alpha 4$ is defined between the respective first ramp surface 482 and a reference line RL4 that is parallel to the mounting longitudinal axis ML. In one example, the angle $\alpha 4$ is an acute angle, and is about 45 degrees. Each of the first ramp surfaces 482 extends straight from the respective sidewall 480 at the angle α4, and is coupled to or integrally formed with a respective one of the second ramp surfaces 484. Each of the second ramp surfaces 484 extends at an angle relative to the mounting longitudinal axis ML. An angle β4 is defined between the respective second ramp surface 484 and a second reference line RL8 that is parallel to the mounting longitudinal axis ML. In one example, the angle β4 is an acute angle, and is about negative 45 degrees. Generally, the angle α4 and the angle β4 are equal and opposite angles.

Each of the second ramp surfaces 484 extends straight from the respective sidewall 480 at the angle β4, and is coupled to or integrally formed with a respective one of the first ramp surfaces 482. Each of the respective first ramp surfaces 482 and the second ramp surfaces 484 are coupled together at a peak 486. The peaks 486 are spaced apart by a pitch or width W4, which is the pitch or the width W4 of the corrugations 474. The line at which the respective sidewall 480 is coupled to or integrally formed with the respective first ramp surface 482 and the second ramp surface 484 defines a trough 488 of the corrugations 474. A depth DC4 of the corrugations 474 is defined as a distance between the peak 486 and the trough 488. In this example, the depth DC4 and the width W4 of the corrugations 474 is the same about the perimeter or circumference of the corrugated bushing 406, but in other examples, the width W4 and/or the depth DC4 may vary about the circumference. The alternating of the peaks 486 and the troughs 488 about the perimeter of the corrugated bushing 406 defines a plurality of undulations spaced apart about a bushing outer perimeter 490 in the axial direction.

Figure 10:
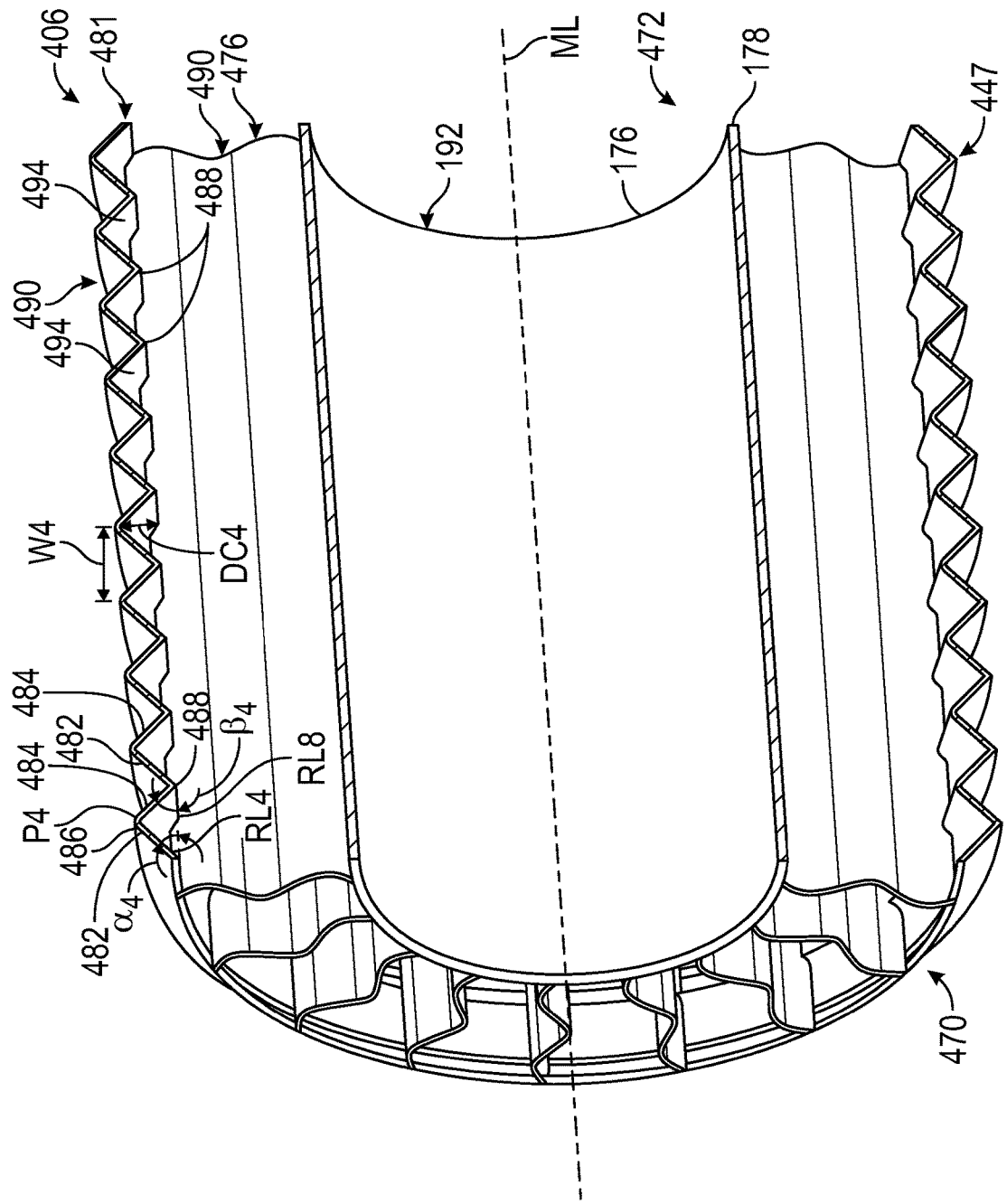
FIG. 10 is a cross-section of the corrugated bushing of FIG. 9, taken along line 10-10 of FIG. 9.
Figure 11:
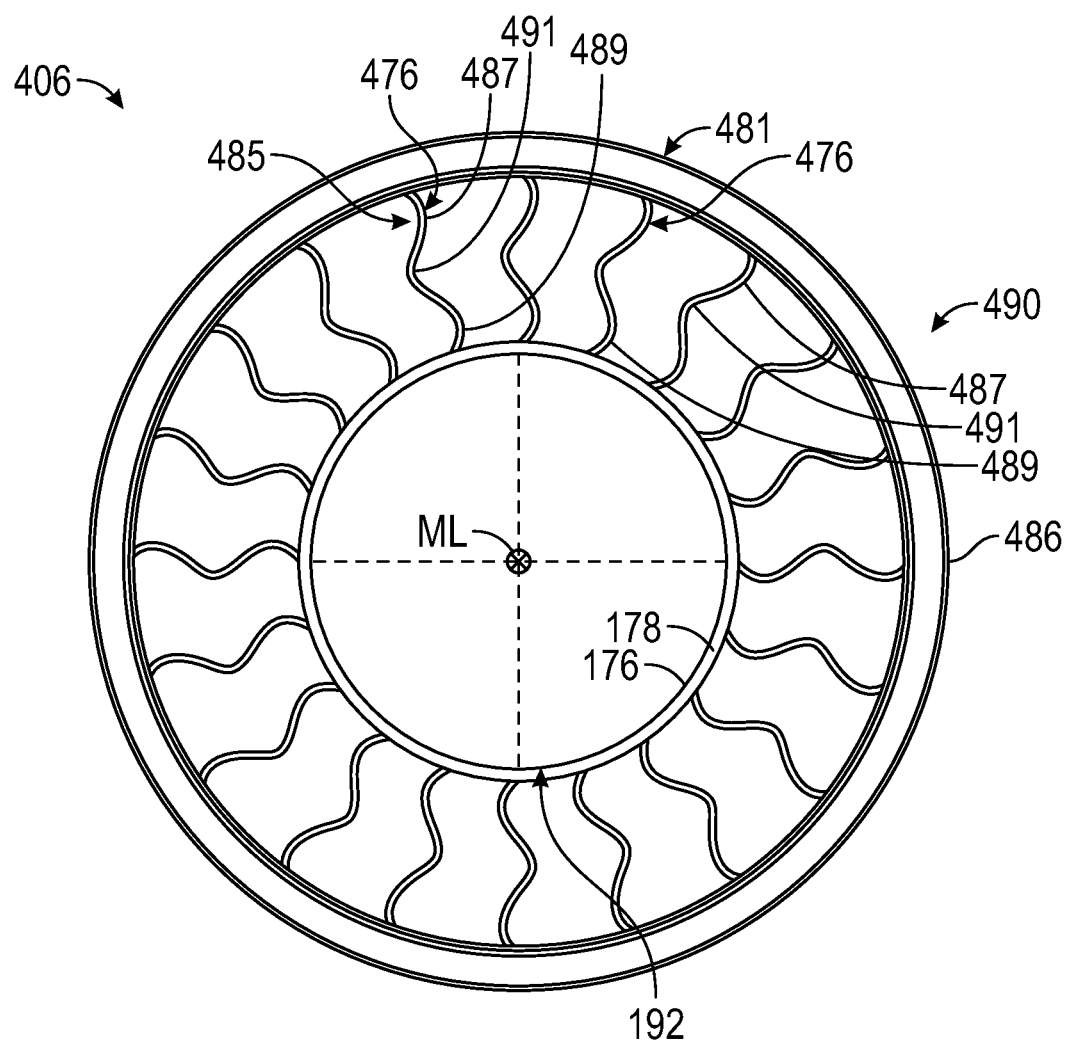
FIG. 11 is an end view of the corrugated bushing of FIG. 9.

The sidewalls 476 interconnect the corrugations 474 with the bushing sleeve 178. In this example, the sidewalls 476 extend radially and axially between the bushing sleeve 178 and the sheet 481. With reference to FIG. 11, the sidewalls 476 are spaced apart about the perimeter or circumference of the bushing bore 176 defined by the bushing sleeve 178. In one example, the sidewalls 476 are wavy or define at least one or a plurality of undulations 485. In this example, the plurality of undulations 485 are defined by a first sidewall peak 487, a second sidewall peak 489 and a sidewall trough 491 in a clockwise direction. The sidewall trough 491 is defined between the first sidewall peak 487 and the second sidewall peak 489. It should be noted that the plurality of undulations 485 may be defined differently, if desired, and for example, may include two sidewall troughs separated by a sidewall peak. Each of the sidewalls 476 has a first end coupled to or integrally formed with the bushing sleeve 178 and an opposite end coupled to or integrally formed with a respective trough 488 of the sheet 481 (FIG. 10). The plurality of undulations 485 defined on the sidewalls 476 provide an additional reduction in stiffness of the corrugated bushing 406.

In this example, with reference to FIG. 10, each of the corrugated bushings 406 has a bushing outer perimeter 490 defined by the corrugations 474, and the bushing inner perimeter 192 defined by the bushing bore 176. The spaced apart sidewalls 476 and the troughs 488 of the corrugations 474 cooperate with the bushing sleeve 178 to define at least one or a plurality of chambers 494 that are spaced apart about the perimeter or circumference of the corrugated bushing 406. In this example, each of the chambers 494 are hollow, however, in other examples, the chambers 494 may be solid or porous. Each chamber 494 is defined between the bushing outer perimeter 490 and the bushing inner perimeter 192. Each chamber 494 is also discrete or not in communication with an adjacent chamber 494. The chambers 494 assist in reducing a stiffness associated with the corrugated bushing 406.

Generally, the corrugated bushings 406 have a stiffness that is about equal to the stiffness of the damping member 142. The stiffness of the corrugated bushings 406 is predetermined such that the corrugated bushings 406 are inhibited from being a primary load path for load transfer between the gearbox 12 and the gas turbine engine 10. In one example, each of the corrugated bushings 406 has the stiffness of about 100 pound force per inch to about 60000 pound force per inch, while the damping member 142 has the stiffness of about 100 pound force per inch to about 60000 pound force per inch based on the operating conditions associated with the gas turbine engine 10. By providing the corrugated bushing 406 with the stiffness about equal to the stiffness of the damping member 142, the corrugated bushing 406 may deflect to assist in sharing a load introduced to the mounting system 100 by a vibration of the gas turbine engine 10. This reduces an amount of load experienced by the damping member 142, which in turn, reduces an amount of compression of the damping member 142. The reduction in the amount of compression of the damping member 142 enables the damping member 142 to provide higher damping, which reduces an amount of load transferred from the mounting system 100 to the gearbox 12. The reduction in the amount of compression of the damping member 142 also improves a life expectancy of the damping member 142.

The bushing sleeve 178 is cylindrical, and the corrugations 374 are coupled to the bushing sleeve 178 on a surface opposite the bushing bore 176. The bushing bore 176 is sized to receive the sleeve 140 proximate and at the second sleeve end 146 such that the respective corrugated bushing 406 is coupled about an outer perimeter or circumference of the sleeve 140 between the damping member 142 and the second sleeve end 146 (FIG. 4). Generally, the bushing bore 176 coupled to the sleeve 140 so as to extend from the collar 152 to the second collar 154. The corrugated bushings 406 extend for a distance defined between the bushing inner perimeter 192 and the bushing outer perimeter 490 that is sized to enable the corrugated bushings 406 to be positioned between the sleeve 140 and a sidewall of the engine coupling bore 136 (FIG. 4) or the left gearbox coupling bore 72a (FIG. 1B). In one example, the distance is equal to or less than about 0.23 inches (in.). In one example, the distance may be sized to define or create the gap 195 (FIG. 4) between the bushing outer perimeter 490 and the engine coupling bore 136 or the left gearbox coupling bore 72a (FIG. 1B). In other embodiments, the bushing outer perimeter 490 may contact the engine coupling bore 136 or the left gearbox coupling bore 72a (FIG. 1B).

With reference back to FIG. 3, in order to assemble the mounting system 100, in one example, with the first bushings 104 formed with the damping member 142 coupled to the sleeve 140 and the corrugated bushings 106, 306, 406 formed, the corrugated bushings 106, 306, 406 are coupled to the sleeve 140 so as to be between the second sleeve end 146 and the damping member 142 of the respective one of the first bushings 104. In the example of the right mount 74, with reference to FIG. 1C, with the corrugated bushings 106, 306, 406 coupled to the first bushings 104, one of the first bushings 104, including one of the corrugated bushings 106, 306, 406, is inserted into the engine coupling bore 136 at the first engine coupling end 132, and the other of the first bushings 104, including the other one of the corrugated bushings 106, 306, 406, is inserted into the engine coupling bore 136 at the second engine coupling end 134. The first bushings 104 are advanced within the engine coupling bore 136 until the respective damping flange 162 contacts the respective one of the first engine coupling end 132 and the second engine coupling end 134. In the example of the left mount 72, with reference to FIG. 1B, with the corrugated bushings 106, 306, 406 coupled to the first bushings 104, one of the first bushings 104, including one of the corrugated bushings 106, 306, 406, is inserted into an end of the left gearbox coupling bore 72a, and the other of the first bushings 104, including the other one of the corrugated bushings 106, 306, 406, is inserted into an opposite end of the left gearbox coupling bore 72a. The first bushings 104 are advanced within the left gearbox coupling bore 72a until the respective damping flange 162 contacts the respective end of the left gearbox coupling bore 72a.

With the mounting system 100 assembled to the mounting housing 98, with reference to FIG. 1C, in one example, the gearbox coupling portion 110 is coupled to the gearbox 12 with the bolt 97. Generally, the mounting housing 98 is coupled to the gearbox 12 such that the gearbox coupling flanges 114, 116 are adjacent to and interleaved with the right gearbox lugs 94, 96. With the right gearbox bores 94a, 96a coaxially aligned with the coupling bores 128, 130, the bolt 97 is inserted through the gearbox coupling portion 110 to couple the gearbox 12 to the mounting housing 98. With the gearbox 12 coupled to the mounting housing 98, the engine coupling portion 112 may be positioned between the right lugs 84, 86. With the right coupling bores 88a, 88b coaxially aligned with the sleeve bores 148, the bolt 90 is inserted through the engine coupling portion 112 to couple the gas turbine engine 10 to the mounting housing 98. With reference to FIG. 1B, in one example, with the mounting system 100 assembled and coupled to the left gearbox coupling bore 72a, the left mount 72 may be positioned between the left lugs 76, 78. With the left coupling bores 80a, 80b coaxially aligned with the sleeve bores 148, the bolt 82 is inserted through the mounting system 100 to couple the gearbox 12 to the gas turbine engine 10 at the left mount 72.

With the gearbox 12 coupled to the gas turbine engine 10 via the mounting system 100 associated with each of the left mount 72 and the right mount 74, in the instance that the gas turbine engine 10 undergoes a vibration, the resulting load from the vibration is transferred to the mounting system 100. In instances of low loads, such as less than about 2000 pound-force (lbf), the damping member 142 undergoes a low deflection, such as less than about 0.15 inches (in.), which enables the damping member 142 to provide less load transfer to the gearbox 12 as the damping member 142 is able to provide a higher amount of damping. In instances of higher loads, such as greater than or equal to about 2000 pound-force (lbf), the corrugated bushings 106, 306, 406 share the load with the damping member 142, which enables the damping member 142 to also undergo a low deflection, such as less than about 0.15 inches (in.). The low deflection of the damping member 142 during the application of high loads enables the damping member 142 to provide less load transfer to the gearbox 12 as the damping member 142 is able to provide higher damping due to the load sharing with the corrugated bushings 106, 306, 406. In addition, by sharing the load with the corrugated bushings 106, 306, 406, a life of the damping members 142 is improved. Generally, the corrugated bushings 106, 306, 406 provide load sharing at about a 20% compression of the damping member 142. By providing the corrugated bushings 106, 306, 406 parallel to the damping members 142 within the engine coupling bore 136, the corrugated bushings 106, 306, 406 also provide for damping of the loads experienced by a vibration of the gas turbine engine 10.

It should be noted that while the mounting system 100 is described herein as including two of the corrugated bushings 106, 306, 406, the mounting system 100 may include one of the corrugated bushings 106 and one of the corrugated bushings 306 or 406, and thus, any combination of corrugated bushings 106, 306, 406 may be employed to share the load experienced by the mounting system 100. In addition, while the corrugated bushings 106, 306, 406 are illustrated herein with the corrugations 174, 374, 474, a second bushing for use with the mounting system 100 may be substantially smooth and define at least one hollow chamber, if desired for the particular application.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A mounting system for coupling a gearbox to an engine, comprising:
    a mounting sleeve including a first sleeve end opposite a second sleeve end, an outer perimeter and a sleeve bore defined through the mounting sleeve from the first sleeve end to the second sleeve end;
    a damping bushing coupled about the outer perimeter of the mounting sleeve at the first sleeve end; and
    a one-piece corrugated bushing coupled about the outer perimeter of the mounting sleeve between the damping bushing and the second sleeve end, the corrugated bushing having a first bushing end opposite a second bushing end and a bushing sleeve defining a bushing bore that extends from the first bushing end to the second bushing end, the mounting sleeve received within the bushing bore such that the first bushing end is adjacent to the damping bushing, and wherein the corrugated bushing comprises a plurality of radially extending sidewalls integrally formed with the bushing sleeve, and a plurality of corrugations coupled to the sidewalls that define a radially outermost surface of the corrugated bushing.

2. The mounting system of claim 1, wherein at least one chamber is defined by the plurality of corrugations between the bushing bore and the outermost surface.

3. The mounting system of claim 2, wherein the at least one chamber comprises a plurality of hollow chambers that are spaced apart about the outermost surface.

4. The mounting system of claim 2, wherein the at least one chamber comprises a plurality of hollow chambers that are spaced apart axially from the first bushing end to the second bushing end of the corrugated bushing.

5. The mounting system of claim 1, wherein the corrugated bushing defines a plurality of undulations that extend tangentially about the outermost surface of the corrugated bushing.

6. The mounting system of claim 1, wherein the corrugated bushing defines a plurality of undulations that extend axially along the outermost surface of the corrugated bushing from the first bushing end to the second bushing end.

7. The mounting system of claim 1, wherein the corrugated bushing includes the plurality of corrugations, each of the plurality of corrugations includes a respective one of the sidewalls, a first ramp surface coupled to the respective sidewall and a second ramp surface coupled to the first ramp surface, and the second ramp surface is coupled to the respective sidewall of an adjacent one of the plurality of corrugations.

8. The mounting system of claim 7, wherein the respective sidewall of each of the plurality of corrugations includes a plurality of undulations.

9. The mounting system of claim 1, wherein the plurality of corrugations are defined on a sheet that defines the outermost surface of the corrugated bushing, each of the plurality of corrugations includes a first ramp surface and a second ramp surface coupled to the first ramp surface, and the sheet is coupled to a bushing sleeve that defines the bushing bore and a bushing inner perimeter of the corrugated bushing by the plurality of the sidewalls.

10. The mounting system of claim 9, wherein each of sidewalls of the plurality of the sidewalls includes a plurality of undulations.

11. The mounting system of claim 1, further comprising a mounting housing that defines a first coupling bore and a second coupling bore, the sleeve, the damping bushing and the corrugated bushing are each configured to be received within the first coupling bore such that the outer perimeter of the sleeve faces an inner diameter of the first coupling bore and the outermost surface of the corrugated bushing is spaced apart from the inner diameter of the first coupling bore, the first coupling bore configured to couple the mounting system to the engine and the second coupling bore is configured to couple the mounting system to the gearbox.

12. A mounting system for coupling a gearbox to an engine, comprising:
a mounting sleeve including a first sleeve end opposite a second sleeve end, and a sleeve bore defined through the mounting sleeve from the first sleeve end to the second sleeve end;
a damping bushing coupled about the mounting sleeve at the first sleeve end; and
a corrugated bushing coupled about the mounting sleeve between the damping bushing and the second sleeve end, the corrugated bushing including a first bushing end opposite a second bushing end, a bushing sleeve that defines a bushing inner perimeter of the corrugated bushing and a plurality of corrugations that define radially outermost surface of the corrugated bushing, the bushing sleeve extends from the first bushing end to the second bushing end and defines a bushing bore, wherein the corrugated bushing comprises a circular array of radially extending separate sidewalls circumferentially spaced from each other around the bushing sleeve, wherein each of the sidewalls has a plate shape so that the sidewalls are thin in a circumferential direction relative to a radial height of each of the sidewalls, wherein the sidewalls are between the bushing sleeve and the corrugations so that the plurality of corrugations and the bushing sleeve cooperate to define a plurality of chambers between adjacent sidewalls of the sidewalls and that extend from the first bushing end to the second bushing end, wherein the mounting sleeve is received within the bushing bore such that the first bushing end is adjacent to the damping bushing and the second bushing end is in contact with the second sleeve end, and wherein the bushing sleeve is coupled to the plurality of corrugations by the sidewalls.

13. The mounting system of claim 12, wherein the plurality of corrugations are defined tangentially about the outermost surface of the corrugated bushing.

14. The mounting system of claim 12, wherein the plurality of corrugations are defined axially from the first bushing end to the second bushing end.

15. The mounting system of claim 12, wherein the sidewalls are planar.

16. The mounting system of claim 12, wherein the sidewalls include a plurality of undulations.

17. The mounting system of claim 16, wherein each of the plurality of undulations includes at least a first sidewall peak, a second sidewall peak and a trough defined between the first sidewall peak and the second sidewall peak in a clockwise direction.

18. The mounting system of claim 12, wherein the plurality of corrugations, the plurality of the sidewalls and the bushing sleeve cooperate to define a plurality of chambers.

19. The mounting system of claim 12, further comprising the gearbox and the gearbox defines a gearbox coupling bore configured to receive the mounting system such that the outermost surface of the corrugated bushing is spaced apart from an inner diameter of the gearbox coupling bore.

20. The mounting system of claim 12, further comprising a mounting housing that defines a first coupling bore and a second coupling bore offset from the first coupling bore, the sleeve, the damping bushing and the corrugated bushing are each configured to be received within the first coupling bore such that an outer perimeter of the sleeve faces an inner diameter of the first coupling bore and the outermost surface of the corrugated bushing is spaced apart from the inner diameter of the first coupling bore, the first coupling bore configured to couple the mounting system to the engine and the second coupling bore is configured to couple the mounting system to the gearbox.

* * * * *